(12) United States Patent
Sunaga et al.

(10) Patent No.: US 6,297,572 B1
(45) Date of Patent: Oct. 2, 2001

(54) BRUSHLESS MOTOR

(75) Inventors: Hideki Sunaga, Gunma; Takeshi Oba, Tochigi; Shigenori Ohira, Ibaraki, all of (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/499,352

(22) Filed: Feb. 8, 2000

(30) Foreign Application Priority Data

Aug. 24, 1999 (JP) .................................................. 11-237316
Nov. 1, 1999 (JP) .................................................. 11-311322
Nov. 4, 1999 (JP) .................................................. 11-314119

(51) Int. Cl.$^7$ .................................................. H02K 11/00
(52) U.S. Cl. ...................... 310/68 R; 310/67 R; 310/71; 310/64
(58) Field of Search .............................. 310/68 R, 67 R, 310/71, 64, 43, 89, 91

(56) References Cited

U.S. PATENT DOCUMENTS

| | | | |
|---|---|---|---|
| 4,529,900 | * 7/1985 | Uzuka | 310/266 |
| 5,825,107 | * 10/1998 | Johnson et al. | 310/64 |
| 5,939,807 | * 10/1998 | Patyk et al. | 310/89 |
| 5,969,445 | * 10/1999 | Horiuchi et al. | 310/64 |
| 6,107,716 | * 8/2000 | Penketh | 310/89 |

FOREIGN PATENT DOCUMENTS 198 00 234 A1 7/1998 (DE).
WO 98/26972 6/1998 (WO).

OTHER PUBLICATIONS

Patent Abstracts of Japan, Publication No. 10191595 dated Jul. 21, 1998, vol. 1998, No. 12.
Patent Abstracts of Japan, Publication No. 10313565 dated Nov. 24, 1998, vol. 1999, No. 02.

* cited by examiner

Primary Examiner—Nestor Ramirez
Assistant Examiner—Thanh Lam
(74) Attorney, Agent, or Firm—Foley & Lardner

(57) ABSTRACT

A brushless motor comprising a housing; a drive shaft rotatably held by the housing; a stator disposed on said housing and having a plurality of coils which are arranged to surround the drive shaft; a yoke secured to the drive shaft to rotate therewith; a plurality of magnets that are held by the yoke in a manner to surround the stator keeping a given space therebetween; an electric parts protecting case on which the housing is mounted; a drive circuit installed in the case for energizing the coils of the stator, the drive circuit including a plurality of switching elements each changing the direction of electric current flowing in the corresponding coil of the stator; a control circuit installed in the case for controlling operation of the switching elements to adjust a rotation speed of the drive shaft; electric connectors for connecting the drive and control circuits; and a heat sink held by the case, the heat sink including a hidden portion exposed to an interior of the case and a plurality of heat radiation fins exposed to the outside of the case, the hidden portion having the switching elements attached thereto. The drive circuit and control circuit are arranged on respective substitutes which are arranged at different positions in the electric parts protecting case. The drive and control circuits are connected through electric connectors.

24 Claims, 25 Drawing Sheets

BRUSHLESS MOTOR

BACKGROUND OF THE INVENTION

1. Field of the Invention

The present invention relates in general to electric motors and more particularly to brushless motors suitable for driving a blower used in an automotive air conditioner.

2. Description of the Prior Art

In order to clarify the task of the present invention, one conventional brushless motor will be described with reference to FIGS. 31 and 32 of the accompanying drawings.

In FIG. 31, there is shown the conventional brushless motor "a" that is used for driving a blower fan "h" of an automotive air conditioner The brushless motor "a" comprises a housing "d" by which a drive shaft "c" is rotatably held through upperand lower bearings "b". A stator "e" is disposed about the housing "d". A cup-shaped yoke "g" is fixed to the drive shaft "c" in a manner to surround the stator "e". A plurality of ferrite magnets "f" are mounted to an inner surface of the yoke "g" keeping a small space from the stator "e". The blower fan "h" is fixed to a leading end of the drive shaft "c", as shown. The stator "e" comprises a plurality of coils "e1" which are arranged to surround the housing "d". The housing "d" is mounted on an electric parts protecting case "k" which houses therein an electric circuit board "j". The circuit board "j" comprises a drive circuit that is provided with a plurality of switching elements "i" for changing the direction of electric current flowing in the coils "e1" of the stator "e" and a motor control circuit that controls a rotation speed of the drive shaft "c" by controlling the switching elements "i". The parts protecting case "k" comprises upper and lower case parts "k1" and "k2" which are detachably coupled. The switching elements "i" are mounted on a heat sink "m" for effectively releasing heat to the outside of the case "k". The heat sink "m" is secured to the upper case part "k1" and formed with heat releasing fins "m1" which are exposed to the open air.

The detail of the heat sink "m" is shown in FIG. 32. As shown, six switching elements "i" are mounted on a rectangular lower block part of the heat sink "m", and each switching element "i" has a plurality of connecting terminals "i1" connected to given portions of the electric circuit board "j".

For assembling the switching elements "i" in the parts protecting case "k", the following assembling process has been employed. That is, before fixing the heat sink "m" to the upper case part "k1", a process for fixing the switching elements "i" to the heat sink "m" and to the electric circuit board "j" is carried out. Thus, before the heat sink "m" is fixed to the upper case part "k1", the entire weight of the heat sink "m" and that of the switching elements "i" have to be supported by only connecting terminals "i1" of the switching elements "i" that extend upward from the electric circuit board "j". Thus, to increase the mechanical strength, a so-called forming process has been applied to the connecting terminals "i1" wherein the terminals "i1" are bent to increase the durability against bending. The forming process is applied also to connecting terminals (not shown) of chemical condensers "n" that are to be connected to the wiring pattern of the electric circuit board "j". The condensers are the elements used in the drive circuit. The electric circuit board "j" has thereon a fuse (not shown) that protects the drive circuit from abnormally high current.

In the FIG. 31, denoted by references "p" are metal pins each passing through the electric circuit board "j" and having an upper end connected to the coils "e1" of the stator "e". Denoted by reference "q" is a joint terminal that passes through the electric circuit board "j" and has one end connected to the drive circuit. Denoted by references "r" are bus bars each having one end connected to a lower end of the corresponding metal pin "p" and a lower end of the joint terminal "q". Each bus bar "r" is provided with a vibration absorbing structure by which transmission of vibration from the terminal pin "p" to a first drive circuit is suppressed or at least minimized.

The electric circuit board "j" is formed with a predetermined wiring pattern. The wiring pattern is made of copper foils printed on a base "j1" made of glass or epoxy resin. A so-called etching process is used for providing such wiring pattern.

However, due to inherent construction, the above-mentioned conventional brushless motor "a" has the following drawbacks.

First, since both the drive circuit and the motor control circuit are provided on the single electric circuit board "j", the wiring pattern of the electric circuit board "j" has to be designed to bear a marked electric current that is needed by the drive circuit. In fact, the current needed by the drive circuit is greater than that needed by the motor control circuit. As a result, the copper foils of the wiring pattern have to have a thicker structure, that however causes an increased cost of the board "j" and thus that of the brushless motor "a".

Second, due to the same reason, the amount of under etching at the time of etching procedure is increased. Considering this, the copper foils of the wiring pattern of the motor control circuit have to have a large width, that makes compactness of the motor control circuit difficult.

Third, due to provision of the chemical condensers "n" mounted on the electric circuit board "j", the wiring pattern on the board "j" has to be designed taking account of a blank space on which the condensers "n" are mounted. This however makes compactness of the board "j" difficult.

Fourth, since the drive circuit and the motor control circuit on the board "j" are positioned close to each other, it becomes necessary to provide filter circuits by which a mutual interference between two circuits is prevented. This induces a bulky and costly construction of the motor "a".

Fifth, since the heat of the drive circuit is transferred to the motor control circuit through the electric circuit board "j", the parts constituting the motor control circuit have to be made of a material having a high heat resistance, which brings about a costly construction of the motor "a".

SUMMARY OF THE INVENTION

It is therefore an object of the present invention to provide a brushless motor which is free of the above-mentioned drawbacks.

According to a first aspect of the present invention, there is provided a brushless motor which comprises a housing; a drive shaft rotatably held by the housing; a stator disposed on the housing and having a plurality of coils which are arranged to surround the drive shaft; a yoke secured to the drive shaft to rotate therewith; a plurality of magnets that are held by the yoke in a manner to surround the stator keeping a given space therebetween; an electric parts protecting case on which the housing is mounted; a drive circuit installed in the case for energizing the coils of the stator, the drive circuit including a plurality of switching elements each changing the direction of electric current flowing in the corresponding coil of the stator, the drive circuit being arranged on a drive circuit substrate; a control circuit installed in the case for controlling operation of the switching elements to adjust a rotation speed of the drive shaft, the control circuit being arranged on a control circuit substrate; electric connectors for connecting the drive and control circuits; and a heat sink held by the case, the heat sink including a hidden portion exposed to an interior of the case and a plurality of heat radiation fins exposed to the outside of the case, the hidden portion having the switching elements attached thereto.

According to a second aspect of the present invention, there is provided an electric blower for use in an automotive air conditioner. The blower comprises a brushless motor comprising a housing, a drive shaft rotatably held by the housing, a stator disposed on the housing and having a plurality of coils which are arranged to surround the drive shaft, a yoke secured to the drive shaft to rotate therewith, a plurality of magnets that are held by the yoke in a manner to surround the stator keeping a given space therebetween, an electric parts protecting case on which the housing is mounted, a drive circuit installed in the case for energizing the coils of the stator and including a plurality of switching elements each changing the direction of electric current flowing in the corresponding coil of the stator, the drive circuit being arranged on a drive circuit substrate, a control circuit installed in the case for controlling operation of the switching elements to adjust a rotation speed of the drive shaft and arranged on a control circuit substrate, electric connectors for connecting the drive and control circuits, and a heat sink held by the case, the heat sink including a hidden portion exposed to an interior of the case and a plurality of heat radiation fins exposed to the outside of the case, the hidden portion having the switching elements attached thereto; and a fan concentrically connected to the drive shaft of the brushless motor to rotate therewith, wherein the heat radiation fins of the heat sink of the brushless motor are positioned in an area where a high speed air flow appears when the brushless motor is energized.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
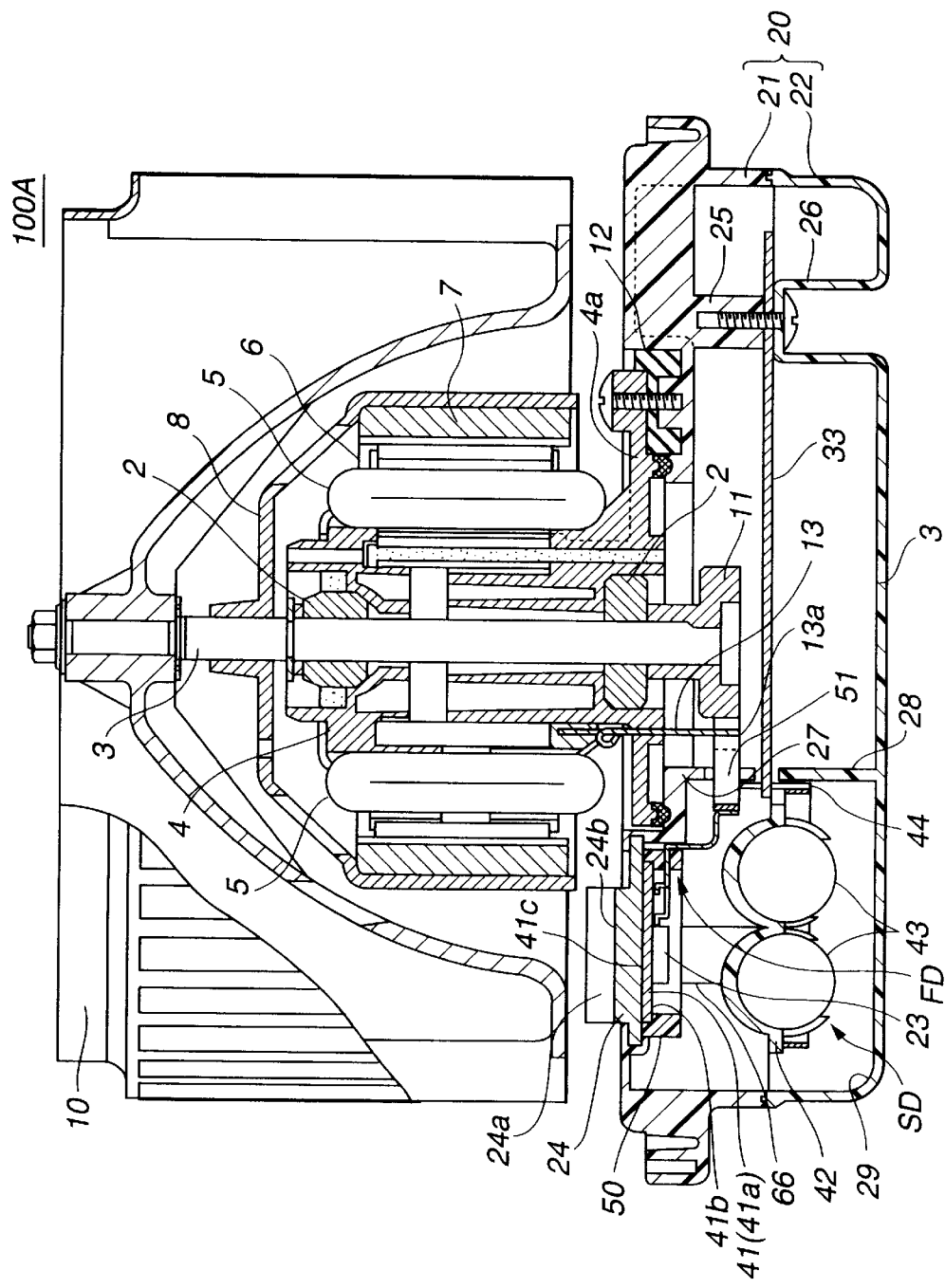
FIG. 1 is a sectional view of a brushless motor of a first embodiment of the present invention.

Referring to FIGS. 1 to 8, particularly FIG. 1, there is shown a brushless motor 100A which is a first embodiment of the present invention.

As is seen from FIG. 2, the brushless motor 100A can be used as a motor for driving a blower or scirocco fan 10 in an automotive air conditioner which will be described in detail hereinafter.

As is best shown in FIG. 1, the brushless motor 100A comprises a housing 4 by which a drive shaft 3 is rotatably held through upper and lower bearings 2. A stator 6 is disposed about the housing 4, which is equipped thereabout with a plurality of coils 5. A cup-shaped yoke 8 is fixed to the drive shaft 3 in a manner to surround the stator 6. A plurality of ferrite magnets 7 are mounted to an inner surface of the yoke 8 keeping a small space from the stator 6. The blower fan 10 is fixed to a leading end of the drive shaft 3, as shown. The housing 4 is mounted on an electric parts protecting case 20 through rubber pads 12. For this mounting, the housing 4 has a lower flange portion 4a bolted to the case 20 through the rubber pads 12. The parts protecting case 20 is constructed of a plastic material.

Connected to a rear end of the drive shaft 3 is a sensor magnet 11 which is held in the parts protecting case 20 and detects an angular position of the yoke 8 relative to the housing 4.

Each coil 5 of the stator 6 is connected to one end of a metal terminal pin 13. As shown, the terminal pin 13 extends along the drive shaft 3 and passes through the flange portion 4a of the housing 4, having the other end 13a located near the sensor magnet 11 in the parts protecting case 20.

The parts protecting case 20 comprises upper and lower case parts 21 and 22 which are detachably coupled. As shown, switching elements 23 are fixed through an aluminum heat sink 24 to the upper case part 21, which generate a certain heat when energized. The heat sink 24 is formed with a plurality of heat radiation fins 24a that are projected from a heat radiation surface 24b to open air. Each switching element 23 functions to change the direction of electric current flowing in the corresponding coil 5 of the stator 6.

Each switching element 23 comprises a MOS type field effect transistor, and the heat sink 24 is secured to upper case part 21 by using the same as an insert upon molding of the upper case part 21.

Figure 2:
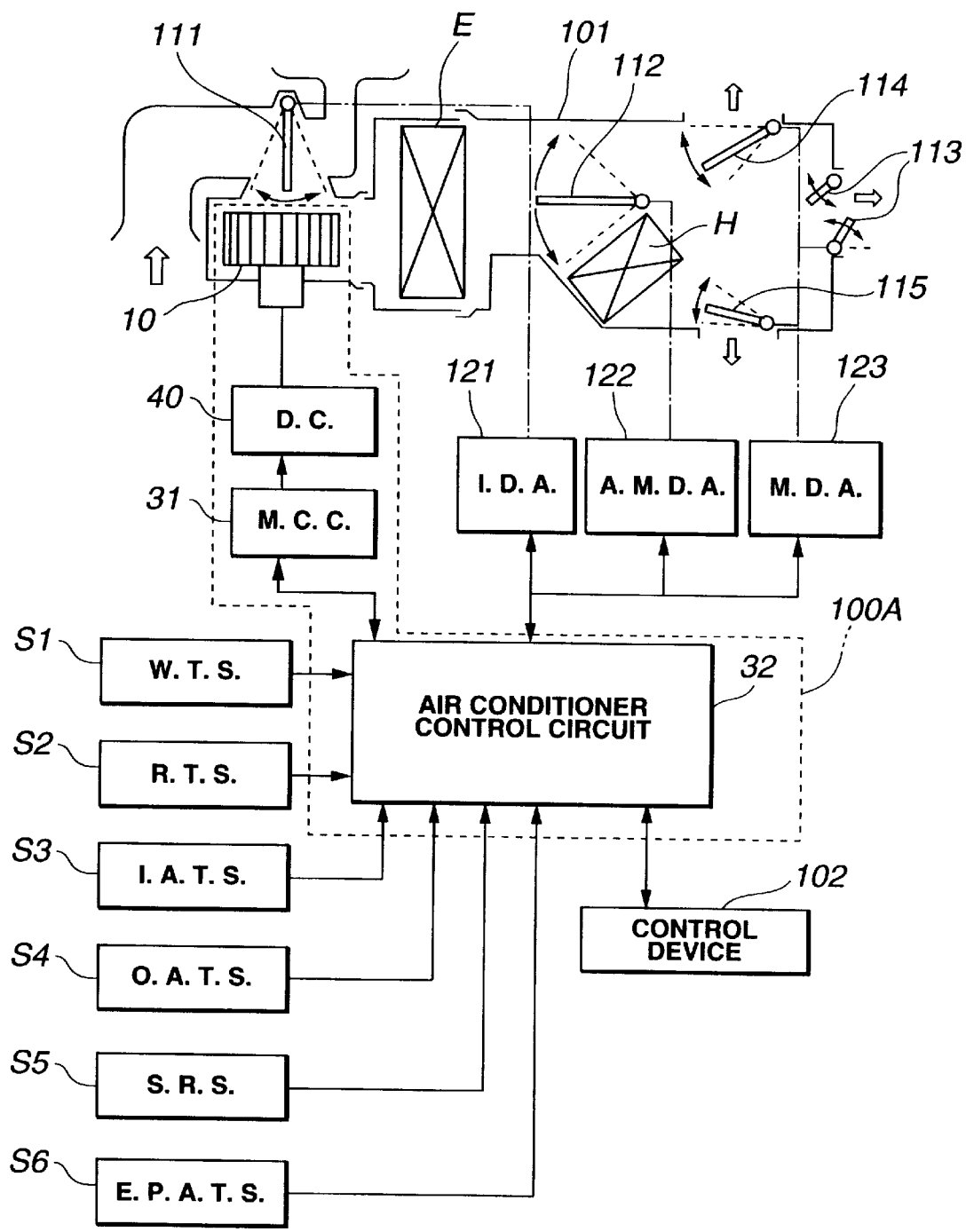
FIG. 2 is a block diagram of an automotive air conditioning system to which the brushless motor of the invention is practically applied.

Within the parts protecting case 20, there are installed many electric parts in addition to the sensor magnet 11, which are a drive circuit 40, a motor control circuit 31 and an air conditioner control circuit 32, which are shown in FIG. 2. The drive circuit 40 is equipped with a plurality of the switching elements 23 and produce a drive current flowing in the coils 5 of the stator 6, the motor control circuit 31 controls a rotation speed of the drive shaft 3 by controlling the switching elements 23 and the air conditioner control circuit 32 controls various control doors of the air conditioner.

As is seen from FIG. 2, the air conditioner control circuit 32 controls both the motor control circuit 31 and various control doors in an air conditioner unit 101, by processing information signals from a water temperature sensor S1, a refrigerant temperature sensor S2, an inside air temperature sensor S3, an outside air temperature sensor S4, a solar radiation sensor S5 and an evaporator passing air temperature sensor S6. The water temperature sensor S1 detects the temperature of engine cooling water flowing into a heat core H, the refrigerant temperature sensor S2 detects the temperature of the refrigerant flowing in a cooling unit of the air conditioner, the inside air temperature sensor S3 detects the temperature of air in the vehicle cabin, the outside air temperature sensor S4 detects the temperature of the outside air, the solar radiation sensor S5 detects the quantity of solar radiation entering the vehicle cabin through a wind shield and the evaporator passing air temperature sensor S6 detects the temperature of air just passing through an evaporator E. The control doors are an air intake door 111 which is positioned upstream of the blower fan 10, an air mix door 112 which is positioned downstream of the evaporator E, and ventilation, defroster and foot doors 113, 114 and 115 which are positioned downstream of the air mix door 112 or the heater core H. Actually, these controls are carried out through corresponding electric actuators 121, 122 and 123.

The air conditioner control circuit 32 is connected to a control device 102 mounted on an instrument panel of the motor vehicle. By manipulating levers, buttons and/or dials of the control device 102, various air conditioning modes are selectively provided by the air conditioner unit 101.

As will be understood from FIG. 1, the above-mentioned air conditioner control circuit 32 and the motor control circuit 31 are provided on a control circuit substrate 33 which is housed in the parts protecting case 20 and has a predetermined wiring pattern which is made of copper foils. The control circuit substrate 33 has a portion put between a downward boss 25 provided on the upper case part 21 and an upward boss 26 provided on the lower case part 22. A bolt (no numeral) is employed for tightening the control circuit substrate 33 to the upper and lower case parts 21 and 22. As shown, the control circuit substrate 33 is positioned below the metal terminal pins 13 and the sensor magnet 11.

The motor control circuit 31 is provided with a plurality of magnetometric sensors (not shown) which detect the angular position of the ferrite magnets 7 in cooperation with the sensor magnet 11. These magnetometric sensors are provided on the control circuit substrate 33 and positioned below the sensor magnet 11.

The drive circuit 40 comprises a first drive circuit FD which includes a plurality of switching elements provided on a body 41a of a first aluminum substrate 41, a second drive circuit SD which includes chemical condensers 43 mounted on a second substrate 42 and a connecting unit 44 which is a connecting bus bar for electrically connecting the first and second drive circuits FD and SD.

The first substrate 41 has a part mounting surface 41b which has the switching elements 23 mounted thereto and a cooling surface 41c which is in contact with a heat sink 24. For fixing the first substrate 41 to the upper case part 21, a supporting case 50 of a plastic is used, which holds a periphery of the first substrate 41. As is seen from FIG. 1, the heat sink 24 is positioned radially outside of the terminal pins 13. The second substrate 42 is positioned below the heat sink 24 and the first substrate 41 and positioned radially outside of the terminal pins 13.

That is, in the brushless motor 100A of this first embodiment, the first and second drive circuits FD and SD are respectively arranged in upper and lower portions in the parts protecting case 20. The second drive circuit SD is positioned below the heat sink 24, and the control circuit substrate 33, the first substrate 41 and the second substrate 42 are positioned away from the terminal pins 13.

The first drive circuit FD is connected through metal bus bars 51 to the leading ends 13a of the terminal pins 13, and each metal bus bar 51 is installed in the parts protecting case 20 at the position near the part mounting surface 41b of the first substrate 41 while separating from the control circuit substrate 33 and the second substrate 42.

As is seen from FIG. 1, when mounted in an air conditioner, the brushless motor 100A is so arranged that the drive shaft 3 extends vertically. This means that the heat sink 24 is positioned above the second drive circuit SD. That is, the heat of air warmed by the second drive circuit SD is effectively radiated by the heat sink 24.

As is shown in FIG. 1, the upper and lower case parts 21 and 22 have respective vertical walls 27 and 28 which are directed toward each other to define a chamber 29 in the parts protecting case 20. The heat sink 24 and the first and second drive circuits FD and SD are installed in the chamber 29. It is to be noted that the motor control circuit 31 and the air conditioner control circuit 32 are not installed in the chamber 29.

Figure 3:
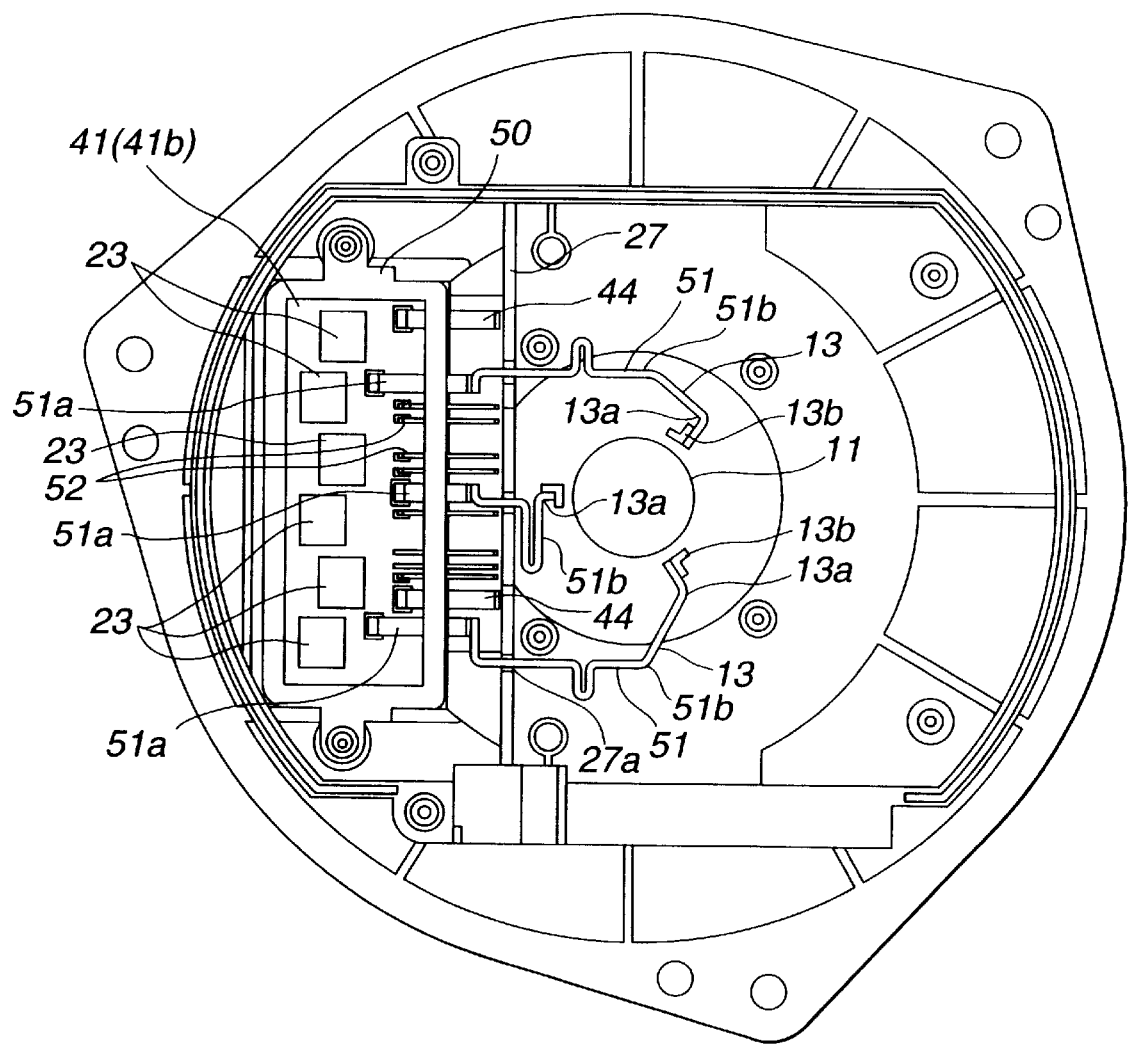
FIG. 3 is a bottom view of the brushless motor of the first embodiment, showing a first drive circuit mounted to an upper case part of an electric parts protecting case.

FIG. 3 is a bottom view of the brushless motor 100A showing the first drive circuit FD connected to the upper case part 21 of the parts protecting case 20. As is seen from this drawing, the leading end 13a of each terminal pin 13 is formed with a tip 13b that extends away from the sensor magnet 11. Each metal bus bar 51 comprises a first bus bar part 51a which is fixed to the supporting case 50 and connected to a wiring pattern on the part mounting surface 41b of the first substrate 41 and a second bus bar part 51b which extends between the first bus bar part 51a and the tip 13b of the terminal pin 13. As shown, the second bus bar part 51b has a U-shaped portion for suppressing or at least minimizing a transmission of undesired vibration of the terminal pin 13 to the first bus bar part 51a. This assures a durable connection between the part 51a and the first substrate 41.

Figure 4:
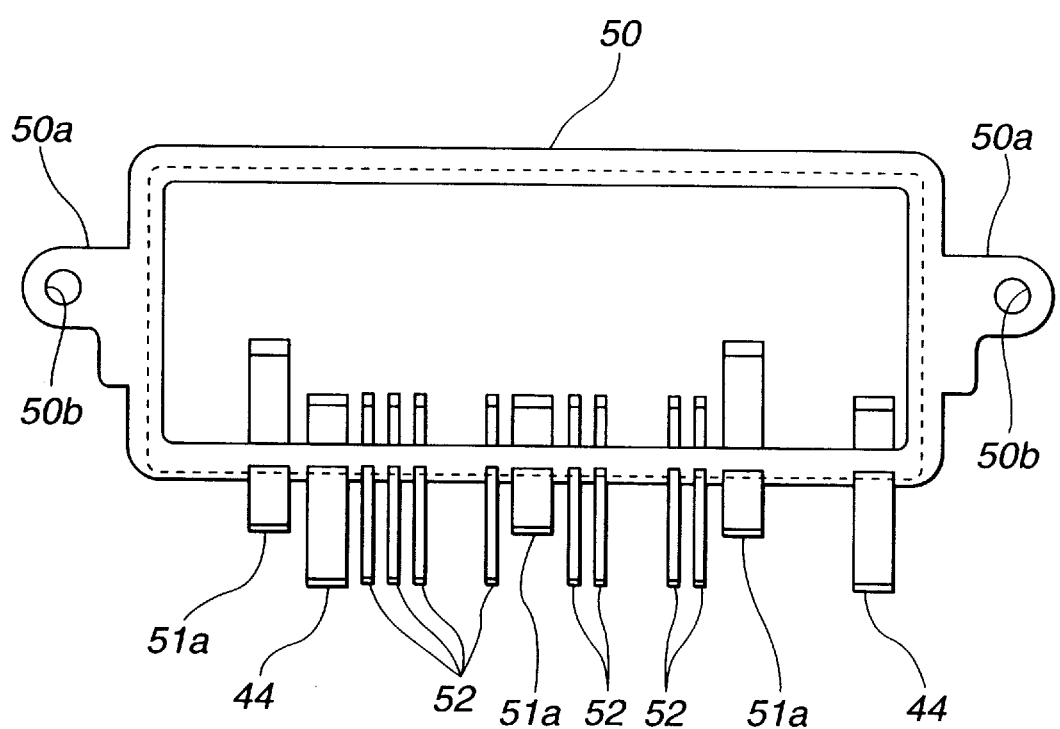
FIG. 4 is a plan view of a supporting case employed in the first embodiment.

As is seen from FIG. 4, to the supporting case 50, there are connected a plurality of thin connectors 52 and thick connectors 44, in addition to the first bus bar parts 51a of the bus bars 51. The connectors 52 are bus bars for connecting the first drive circuit FD to the motor control circuit 31, and the connectors 44 are bus bars for connecting the first and second drive circuits FD and SD. These connectors 52 and 44 have respective ends connected to predetermined portions of the wiring pattern of the first substrate 41. As is seen from this drawing, the supporting case 50 is formed at both sides thereof with ear portions 50a each being sandwiched between the upper case part 21 and the second substrate 42. Each ear portion 50a has an opening 50b.

Referring back to FIG. 3, the vertical wall 27 of the upper case part 21 is formed with grooves 27a through which the second bus bar parts 51b pass.

As is seen from FIGS. 3 and 4, each first bus bar part 51a, each thin connector 52 and each connector 44 have respective ends corrected to predetermined portions of the wiring pattern on the first substrate 41.

Figure 5:
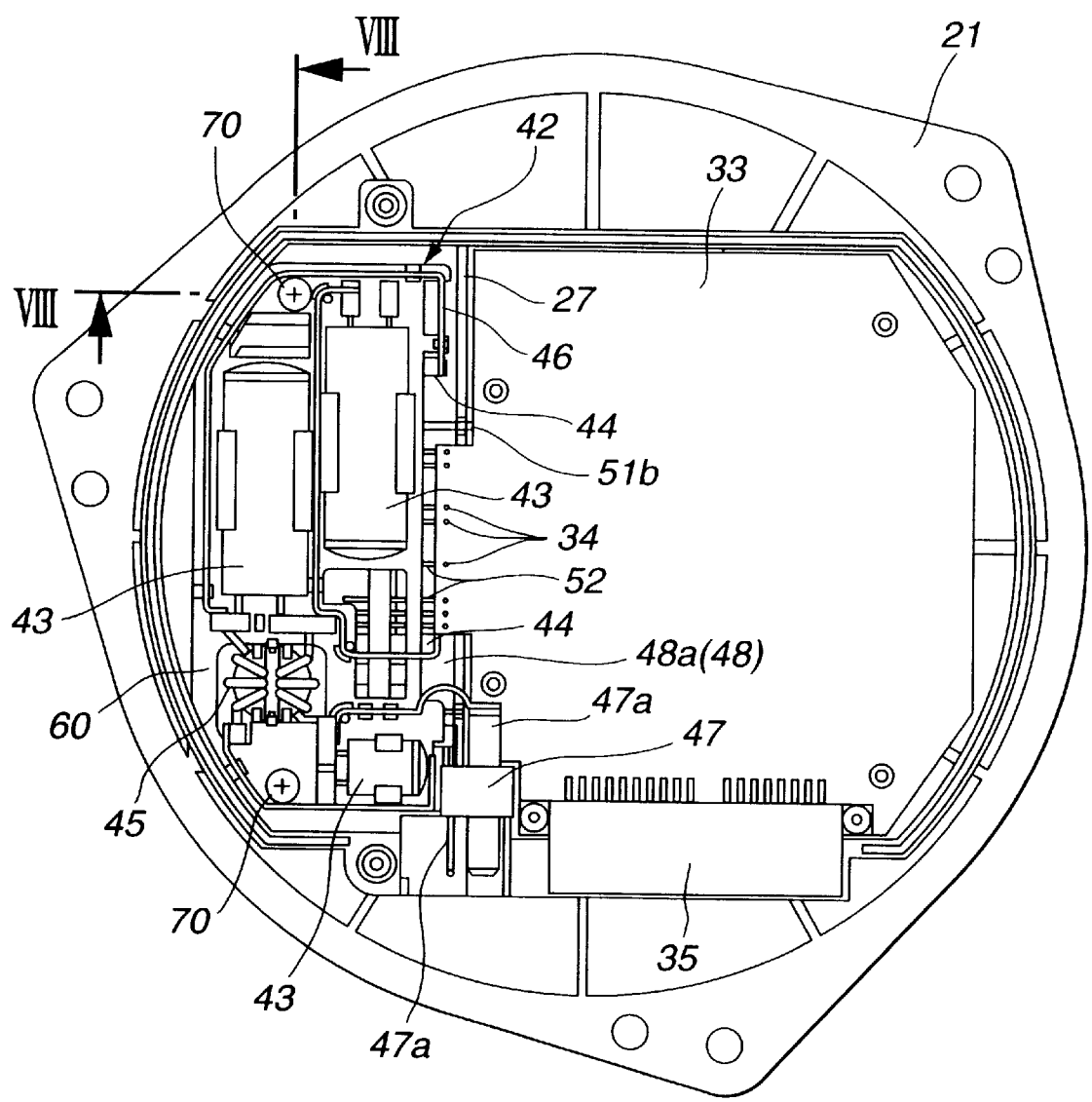
FIG. 5 is a bottom view of the brushless motor of the first embodiment with a lower case removed.

FIG. 5 is a bottom view of the brushless motor 100A with the lower case part 22 removed. As shown in this drawing, the control circuit substrate 33 is formed with a plurality of openings 34 through which terminal pins of the thin connectors 52 pass for being welded thereto. With this, electric connection is achieved between the first drive circuit FD and the motor control circuit 31.

As is described hereinabove, the electric connection between the first drive circuit FD and each of the terminal pins 13 is made at a position above the control circuit substrate 33. For facilitating this connection, almost parts of the motor control circuit 31 and the air conditioner control circuit 32 are mounted to a lower surface of the control circuit substrate 33. Denoted by numeral 35 is a signal connector that is mounted to also the lower surface of the substrate 33. To this signal connector 35, there are connected cables extending from the control device 102 (see FIG. 2) and cables extending from the sensors such as the water temperature sensor S1, the refrigerant temperature sensor S2 and so on.

As is described hereinabove, in the brushless motor 100A, the chemical condensers 43 and a common mode choke coil 45 that constitute a part of the second drive circuit SD are mounted to the lower surface of the second substrate 42. The second substrate 42 has bus bars 46 to which the connectors 44 are connected to establish an electric connection between the first and second drive circuits FD and SD.

The second drive circuit SD is equipped with a power source connector 47 to which cables from an electric power source are connected. Plus and minus terminals 47a and 47b of the power source connector 47 are connected to the bus bars 46. In the path between the plus terminal 47a and the bus bars 46, there is arranged a metal tip 48 forming a fuse 48a. As shown, the metal tip 48 comprises a flexible semicircular portion and flat portions between the semicircular portion is arranged. As is known, the fuse 48a becomes melted down when heated to a certain degree. One end of the metal tip 48 is welded to a portion of the bus bar 46 and the other end of the same is welded to the plus terminal 47a of the power source connector 47. That is, when, due to failure of the brushless motor 100A, an abnormally high current flows through the fuse 48a, the fuse 48a becomes melted down and thus the electric connection between the bus bar 46 and the power source connector 47 becomes cancelled, which protects the second drive circuit SD from such high current.

As will be described in detail hereinafter, the bus bars 46 are positioned away from a plastic body 60 of the second substrate 42. Thus, for fixing the fuse 48a to the given position, it is preferable to fix through welding one end of the fuse 48a to the bus bars 46 before the other end of the fuse 48a is connected to the terminal 47a through spot welding upon assembly of the second drive circuit SD. These steps suppress the second substrate 42 from being damaged by a melted metal article that would be produced when the end of the fuse 48a is welded to the bus bars 46.

Figure 6A:
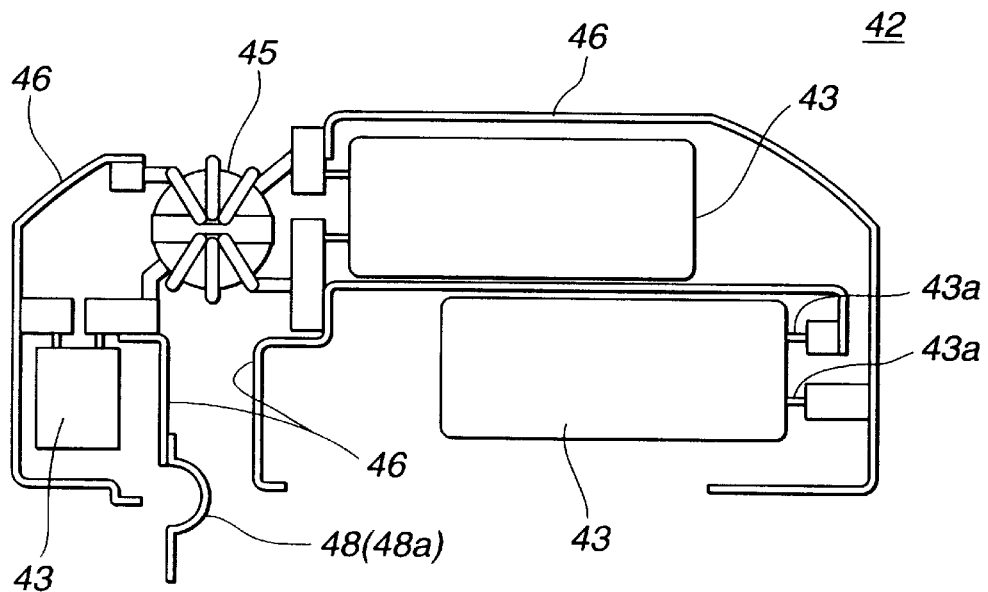
FIG. 6A is a plan view of a second drive circuit employed in the first embodiment, showing electric parts and a wiring pattern.
Figure 6B:
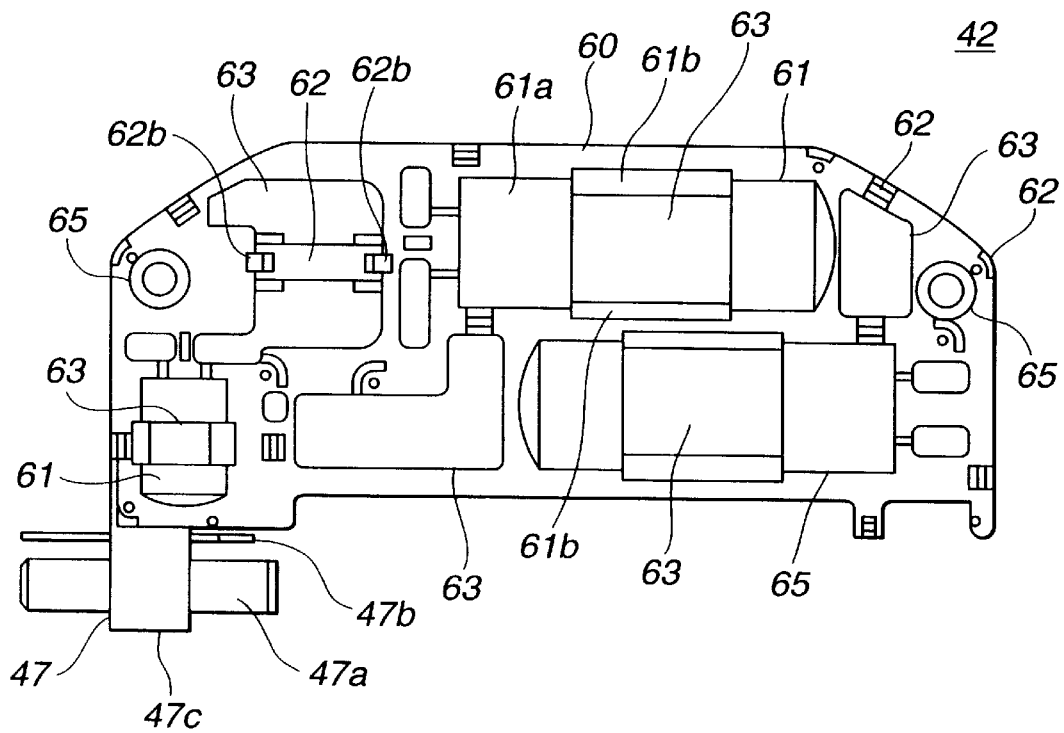
FIG. 6B is a plan view of the second drive circuit, showing a substitute for the circuit.
Figure 7:
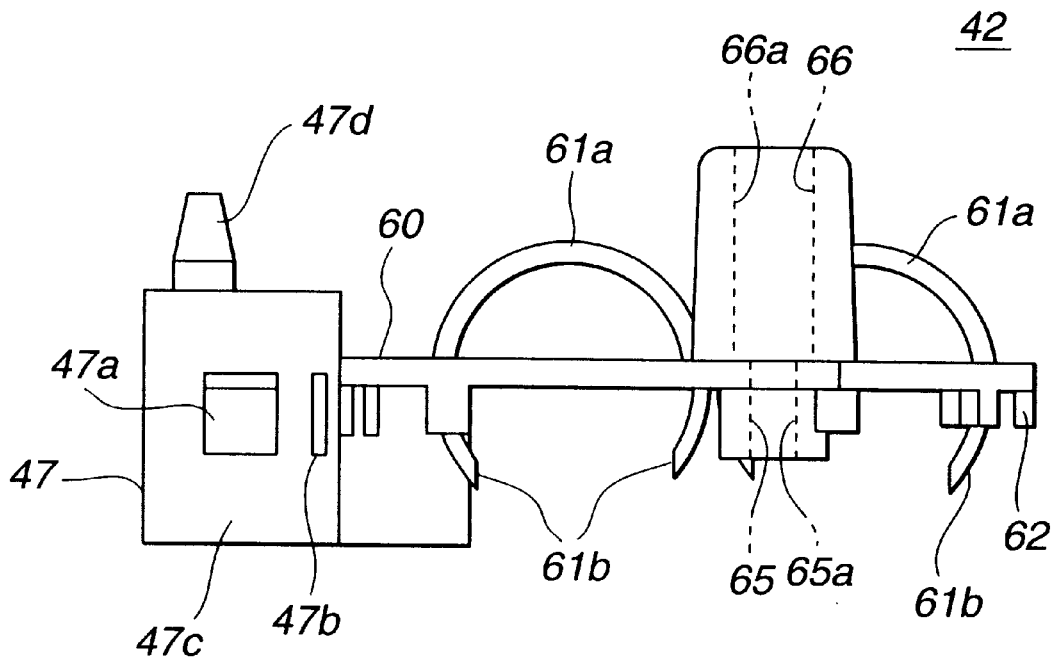
FIG. 7 is an enlarged view of the substitute of the second drive circuit, taken from a right side of FIG. 6B.

FIGS. 6A and 6B are plan views of the second drive circuit SD. In detail, FIG. 6A shows electric parts and a wiring pattern for the second drive circuit SD, and FIG. 6B shows the body of the second substrate 42. FIG. 7 is a side view of the second substrate 42.

As is seen from these drawings, the second substrate 42 comprises the base body 60 of plastics and the bus bars 46 to which the chemical condensers 43, the common mode choke coil 45 and the power source connector 47 are connected through given wiring patterns. As is seen from FIGS. 6B and 7, the base body 60 is integrally formed with a holder portion 47c by which the plus and minus terminals 47a and 47b of the power source connector 47 are tightly held. Furthermore, the base body 60 is formed with holding portions 61 for folding the chemical condensers 43, a holding portion 62 for holding the common mode choke coil and a plurality of openings 63.

The holding portion 61 for each chemical condenser 43 comprises a recessed portion 61a into which the corresponding condenser 43 is intimately received and a first pair of holding pawls 61b which detachably hold the condenser 43 in a snap action manner when the latter is put into the recessed portion 61a. As will be seen from FIG. 6A, when the condenser 43 is put into the recessed portion 61a and held by the holding pawls 61b, terminals 43a of the condenser 43 become in contact with the bus bars 46 of the second substrate 42.

As is seen from FIG. 6B, the holding portion 62 for the common mode choke coil 45 comprises a supporting member 62a for supporting the coil 45 and a second pair of holding pawls 62b which detachably hold the coil 45.

The base body 60 is formed at its front surface with a plurality of guide portions 64 for guiding the bus bars 46 and first tubular portions 65 (see FIG. 8) each having a through passage 65a for a screw bolt or vis 70. A back surface of the base body 60 is formed with a second tubular portion 66 that has a guide hole 66a connected with the through passage 65a of the first tubular portion 65. The holder portion 47c of the power source connector 47 is formed at its back surface with a positioning boss 47d which positions the base body 60 when the latter is mounted to the upper case part 21.

Figure 8:
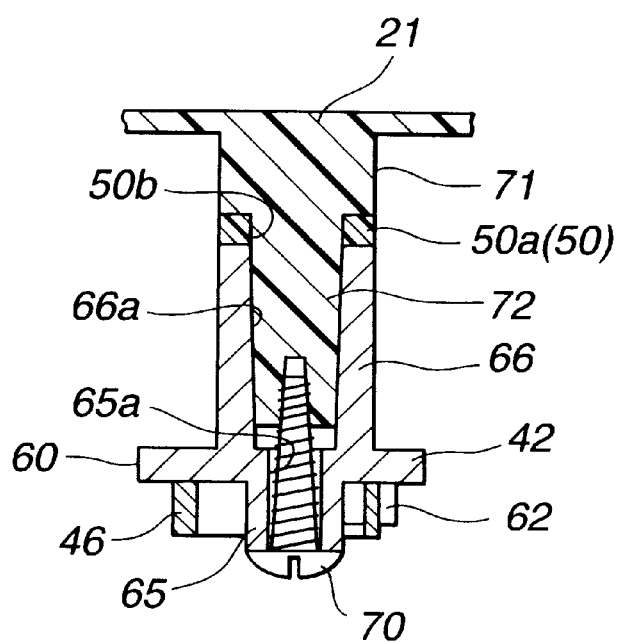
FIG. 8 is an enlarged sectional view taken along the line VIII—VIII of FIG. 5.

FIG. 8 is a sectional view taken along the line X—X of FIG. 5. As is seen from this drawing, the upper wall of the upper case part 21 is formed at its lower surface with a downward projection 71 which holds the ear portion 50a of the supporting case 50 in corporation with the second tubular portion 66 of the base body 60 of the second substrate 42. The downward projection 71 is integrally formed with a downward guide stud 72 that passes through the opening 50b of the ear portion 50a and the second tubular portion 66 of the base body 60 of the second substitute 42. The leading end of the guide stud 72 is formed with a threaded bore with which the screw bolt 70 is engaged. It is thus to be noted that when the screw bolt 70 is turned in a fastening direction, the second substrate 42 and the supporting case 50 are tightly secured to the upper case part 21, and the first substrate 41 is connected to the heat sink 24 (see FIG. 1) via the supporting case 50.

In the following, advantages possessed by the brushless motor 100A of the first embodiment will be described.

Figure 31:
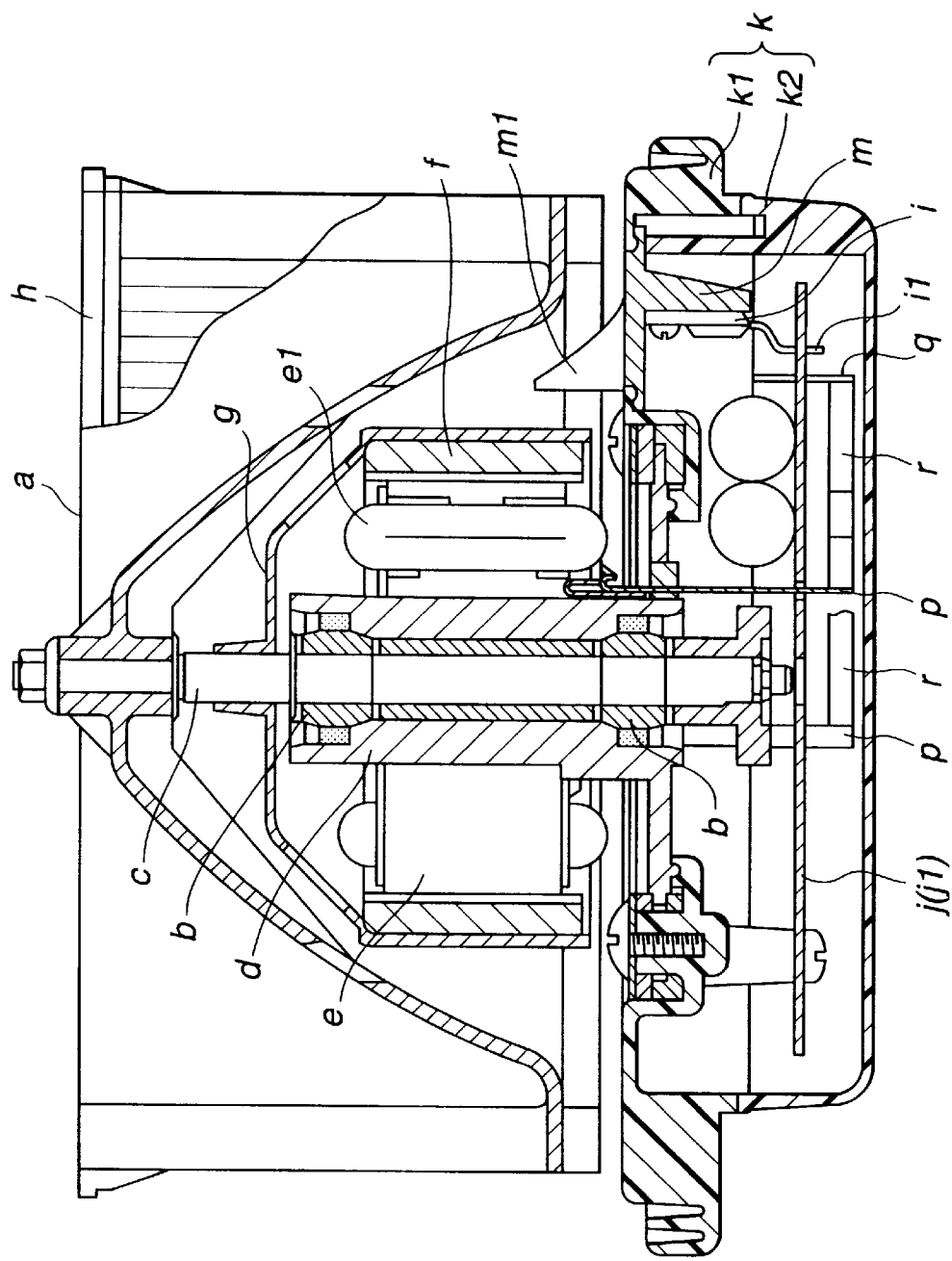
FIG. 31 is a sectional view of a conventional brushless motor.
Figure 32:
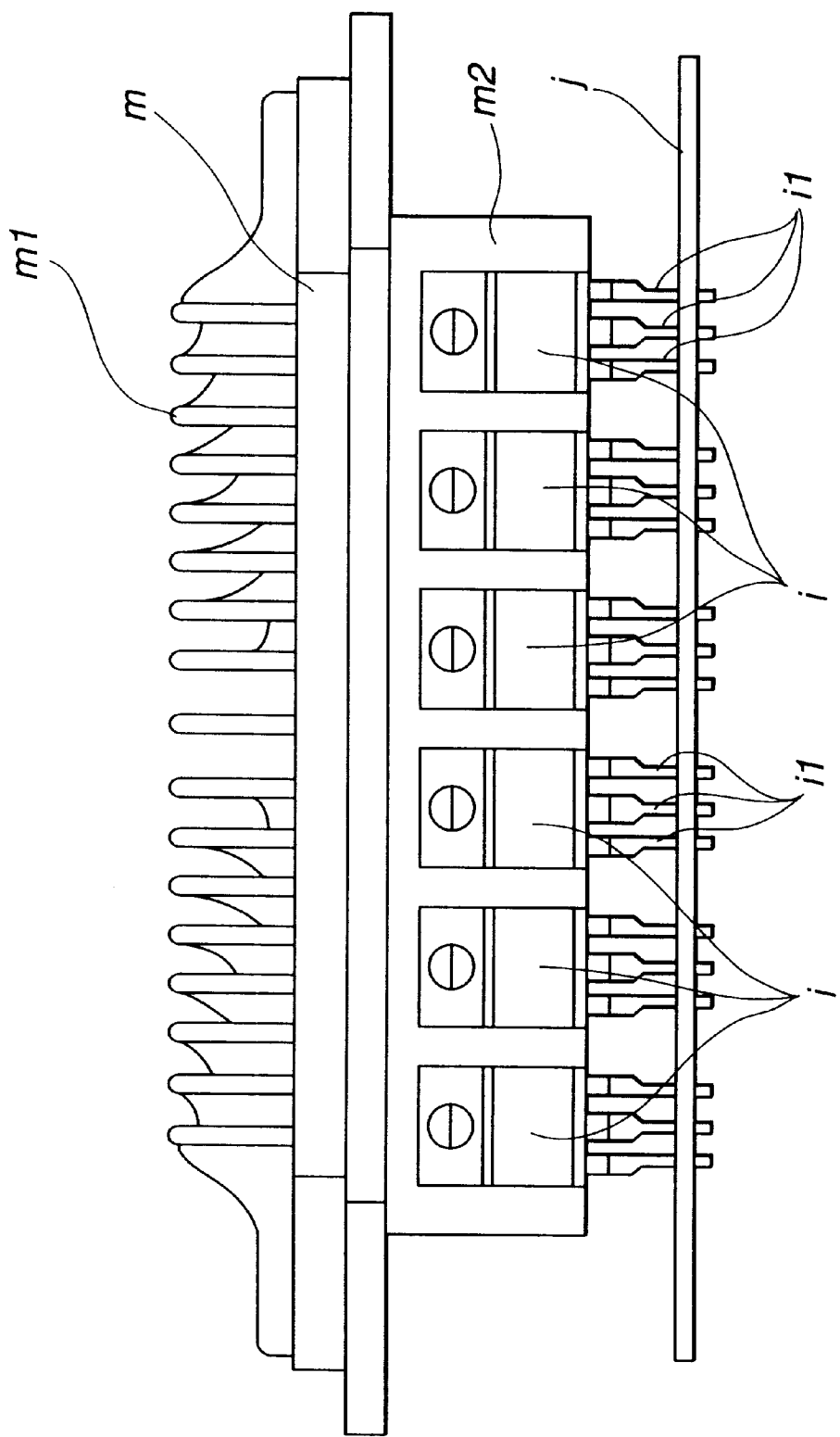
FIG. 32 is a side view of a heat sink employed in the conventional brushless motor.

As is described hereinabove, in the brushless motor 100A, the control circuit substrate 33 is arranged separately from the first and second substrates 41 and 42 of the drive circuit 40 for the drive shaft 3. Thus, the wire pattern for the motor control circuit 31 on the control circuit substrate 33 can be easily designed leaving the current, fed for driving the drive shaft 3, out of consideration. Thus, the wire pattern of the motor control circuit 31 can be produced compact in size and thickness as compared with that used in the above-mentioned conventional brushless motor of FIG. 31, which induces a reduced cost of the brushless motor 100A.

Due to the same reason, the amount of under etching at the time of etching procedure can be reduced and thus the distance between neighboring two bus bars can be reduced, which makes the motor control circuit 31 compact in size.

Since the control circuit substrate 33 on which the motor control circuit 31 is arranged separately from the first and second substrates 41 and 42 of the drive circuit 40 for the drive shaft 3, the electromagnetic wave inevitably emitted from the drive circuit 40 hardly affects the wire pattern of the motor control circuit 31, and thus, the circuit 31 is prevented from generating undesirable noises. Thus, a noise cut filter is not necessary, unlike the case of the above-mentioned conventional motor. Due to the same reason, the wire pattern of the motor control circuit 31 has no need of making a detour to avoid the chemical condensers 43 of the drive circuit 40, which promotes the compactness of the motor control circuit 31. Furthermore, by the same reason, the heat generated at the drive circuit 40 is suppressed from transferring to the motor control circuit 31.

In the brushless motor 100A, the drive circuit 40 and the heat sink 24 are housed in the chamber 29 of the parts protecting case 20 and the motor control circuit 31 is isolated from both the drive circuit 40 and the heat sink 24. Thus, transference of the heat of the drive circuit 40 to the motor control circuit 31 by air convection in the parts protecting case 20 is effectively reduced.

In the brushless motor 100A, the drive circuit 40 is arranged to have the first drive circuit FD that has the switching elements 23 mounted on the first substrate 41, the second drive circuit SD that has the chemical condensers 43 and other electric parts mounted on the second substrate 42 and the connecting unit 44 that connects the first and second drive circuits FD and SD, and the first and second drive circuits FD and SD are respectively located at upper and lower portions of the parts protecting case 20. Thus, the packaging density of the case 20 is increased.

In the brushless motor 100A, the heat sink 24 is positioned above the second drive circuit SD. Thus, the heat generated by the second drive circuit SD and carried upward by the air convection is effectively discharged to the open air by the heat sink 24. Thus, undesired temperature increase in the parts protecting case 20 is suppressed or at least minimized.

In the brushless motor 100A, the switching elements 23 are mounted to the first substrate 41 of aluminum, and the first substrate 41 intimately contacts to and is secured to the heat sink 24 fixed to the upper case part 21. This arrangement brings about no necessity of using troublesome and time consumed above-mentioned forming process. That is, mounting of the switching elements 23 to the first substrate 41 is facilitated.

In the brushless motor 100A, the heat sink 24 is fixed to the upper case part 21 through an insert molding technique, which facilitates assembly of the motor.

In the brushless motor 100A, the depth of the recessed portion 61a of each holding portion 61 is so determined that when the condenser 43 is put into the recessed portion 61a the terminals 43a of the condenser 43 become in contact with the bus bars 46 of the second substrate 42. Accordingly, there is no need of using a forming process to the chemical condensers 43.

In the brushless motor 100A, the plastic body 60 of the second substitute 42, the ear portion 50a of the supporting case 50 and the downward projection 71 of the upper case part 21 are fastened together by the screw bolt 70, which promotes assembling of the motor 100A.

In the brushless motor 100A, with the supporting case 50 kept fixed to the first substrate 41, the parts 51a of the first bus bars 51, the thin connectors 52 and the thick connectors 44 can be brought to right positions where respective ends of them 51a, 52 and 44 are placed to given portions of the wire pattern of the first substrate 41. This facilitates welding of them to the given portions.

In the brushless motor 100A, the holder portion 47c of the power source connector 47 is integrally formed on the base body 60 of the second substrate 42. Thus, any stress applied to the holding portion 47c when an electric cable is plugged to or detached from the power source connector 47 is evenly dispersed to the entirety of the base body 60, which improves the reliability of the second drive circuit SD.

In the brushless motor 100A, the control circuit substrate 33, the first substrate 41 and the second substrate 42 are arranged in a manner to keep away from the terminal pins 13, and the bus bars 51 are mounted to the mounting surface 41b of the first substrate 41 in a manner to keep away from the control circuit substrate 33 and the second substrate 42. Accordingly, there is no need of providing the first or second substrate 41 or 42 with an opening through which the terminal pins 13 and the drive circuit 40 by means of the bus bars 51. Accordingly, the packing density of the first substrate 41, the second substrate 42 and the control circuit substrate 33 is increased.

In the brushless motor 100A, the fuse 48a of the metal tip 48 is directly connected to the plus terminal of the power source connector 47. Thus, there is no need of providing the fuse on the body 60 of the second substrate 42, which allows a compact construction of the body 60.

In the brushless motor 100A, the motor control circuit 31 and the air conditioner control circuit 32 are integrally provided on the control circuit substrate 33, which induces a reduced cost of the motor 100A.

When the scirocco fan 10 is mounted to the brushless motor 100A as shown in FIG. 1, the heat radiation fins 24a of said heat sink 24 are positioned in an area where a high speed air flow appears when the fan 10 is driven by the brushless motor 100A. More specifically, the heat radiation fins 24a are positioned blow the fan 10 within an area that faces an entirety of a bottom of the fan 10.

Figure 9:
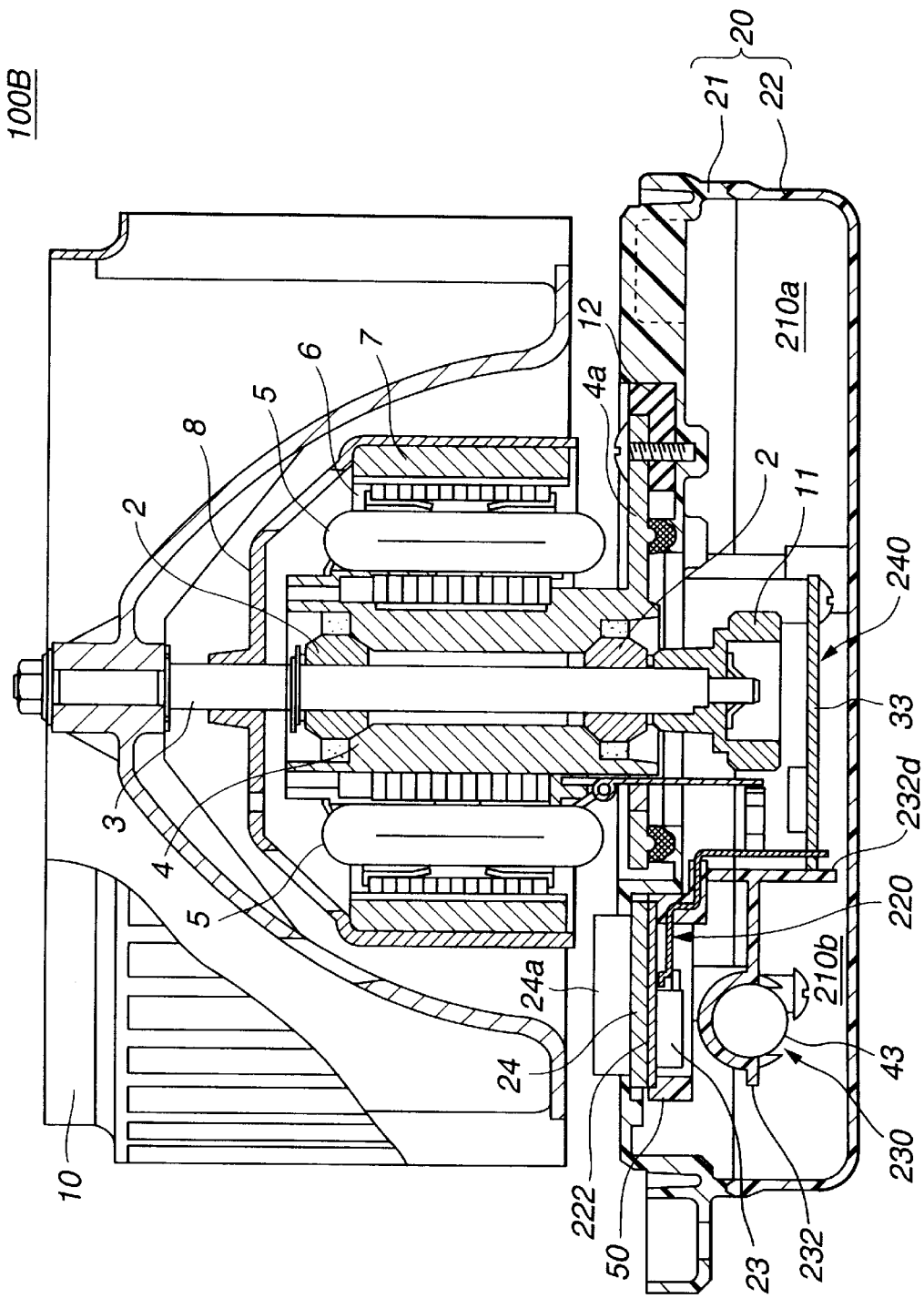
FIG. 9 is a sectional view of a brushless motor of a second embodiment of the present invention.

Referring to FIGS. 9 to 17, particularly FIG. 9, there is shown a brushless motor 100B which is a second embodiment of the present invention.

Since the brushless motor 100B of this embodiment is similar in construction to the above-mentioned brushless motor 100A of the first embodiment, detailed explanation will be directed to only parts and portions which are different from those of the first embodiment 100A. Substantially the same parts as those of the first embodiment 100A are denoted by the same numerals for ease of understanding.

As will be easily understood when comparing FIGS. 1 and 9, the lower part of the brushless motor 100B is different from that of the first embodiment 100A.

In the second embodiment 100B, within an electric parts protecting case 20, there are arranged a first drive circuit 220, a second drive circuit 230 and a control circuit 240. The first drive circuit 220 is provided with a plurality of switching elements 23 for switching the flow paths of current flowing through the coils 5 of the stator 6. The second drive circuit 230 is designed to feed the switching elements 23 with the drive current. The control circuit 240 is designed to adjust the rotation speed of the drive shaft 3 by controlling the timing of the flow path switching.

The first drive circuit 220 has an aluminum substrate 222 on which the switching elements 23 are mounted. Each switching element 23 comprises a MOS type field effect transistor. The aluminum substrate 222 is enclosed by a plastic supporting case 50.

The second drive circuit 230 has a plastic holding case 232 to which a chemical condenser 43 is fixed. The second drive circuit 230 is positioned below an aluminum heat sink 24 and the first drive circuit 220. As shown, the supporting case 50 is arranged between the heat sink 24 and the holding case 232, and the supporting case 50 and the holding case 232 are fixed to the upper case part 21 through bolts (no numerals). The heat sink 24 is fixed to the upper case part 21 and formed with a plurality of heat radiation fins 24a that are exposed to the open air for effectively radiating heat of the first and second drive circuits 220 and 230 to the open air. In fact, under operation, the switching elements 23 of the first drive circuit 220 generate a marked heat.

The control circuit 240 has a control circuit substrate 33 to which Hall-elements and parts of microcomputer are mounted. The substrate 33 is positioned below the sensor magnet 11 and connected to the upper case part 21 through bolts (no numerals).

Figure 10:
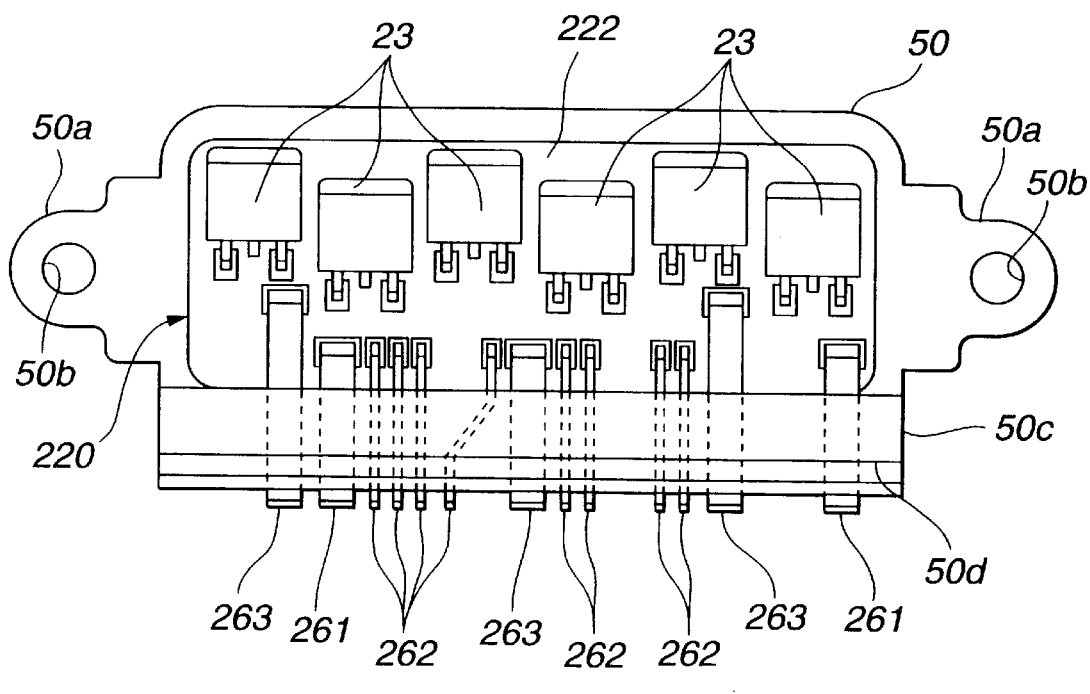
FIG. 10 is a plan view of a supporting case employed in the second embodiment.
Figure 11:
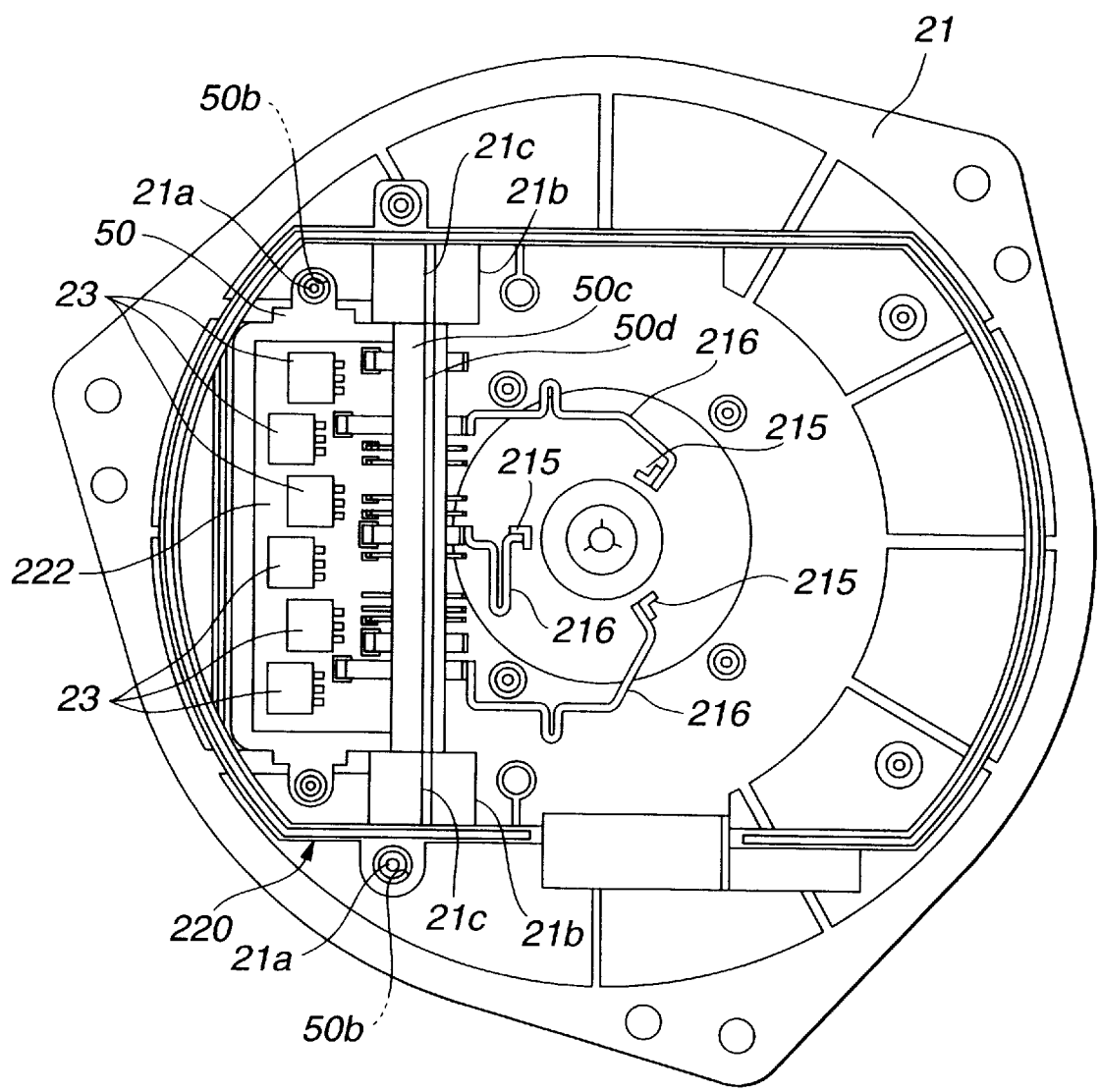
FIG. 11 is a bottom view of the brushless motor of the second embodiment, showing the supporting case secured to an upper case part of an electric parts protecting case.

FIG. 10 is a plan view showing the first drive circuit 220 and the supporting case 50, and FIG. 11 is a bottom view of the brushless motor 100B showing the first drive circuit 220 and the supporting case 50 mounted to the upper case part 21 of the parts protecting case 20. As is seen from these drawings, six switching elements 23 are mounted on the aluminum substrate 222 of the first drive circuit 220. Like in the first embodiment 100A, the supporting case 50 is formed with ear portions 50a each being formed with an opening 50b. Projections 21a extending from the upper case part 21 are received in the openings 50b of the ear portions 50a of the supporting case 50.

To the supporting case 50, there are fixed two terminals 261 by which the first and second drive circuits 220 and 230 are electrically connected, eight terminals 262 by which the first drive circuit 220 and the control circuit 240 are electrically connected, and three terminals 263 by which the first drive circuit 220 and terminal pins 215 are electrically connected with the aid of respective bus bars 216. Each terminal pin 215 is connected to the corresponding coil 5 of the stator 6. As is seen from FIG. 11, each bus bar 216 has a U-shaped portion for facilitating a welding to the corresponding terminal 263 and obtaining a flexibility of the same.

As is seen from FIG. 10, the supporting case 50 is provided with an elongate connecting portion 50c to which the terminals 261, 262 and 263 are connected. The elongate connecting portion 50c is formed with an elongate groove 50d which has a generally U-shaped cross section. As is seen from FIG. 11, the inner surface of the upper case part 21 is formed with stepped portions 21b which are flush with the elongate connecting portion 50c of the supporting case 50. Each stepped portion 21b is formed with a groove 21c which is aligned with the elongate groove 50d of the elongate connecting portion 50c of the supporting case 50.

Figure 12:
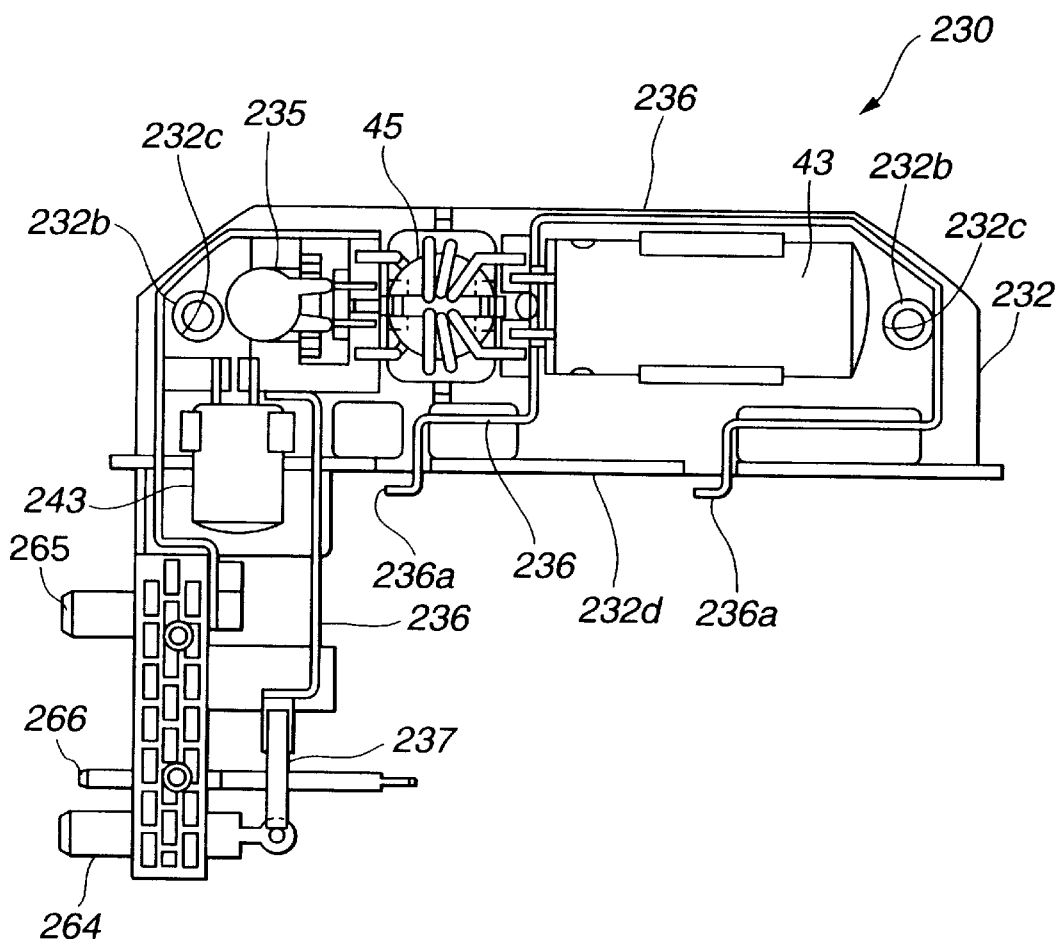
FIG. 12 is a plan view of a second drive circuit employed in the second embodiment.
Figure 13:
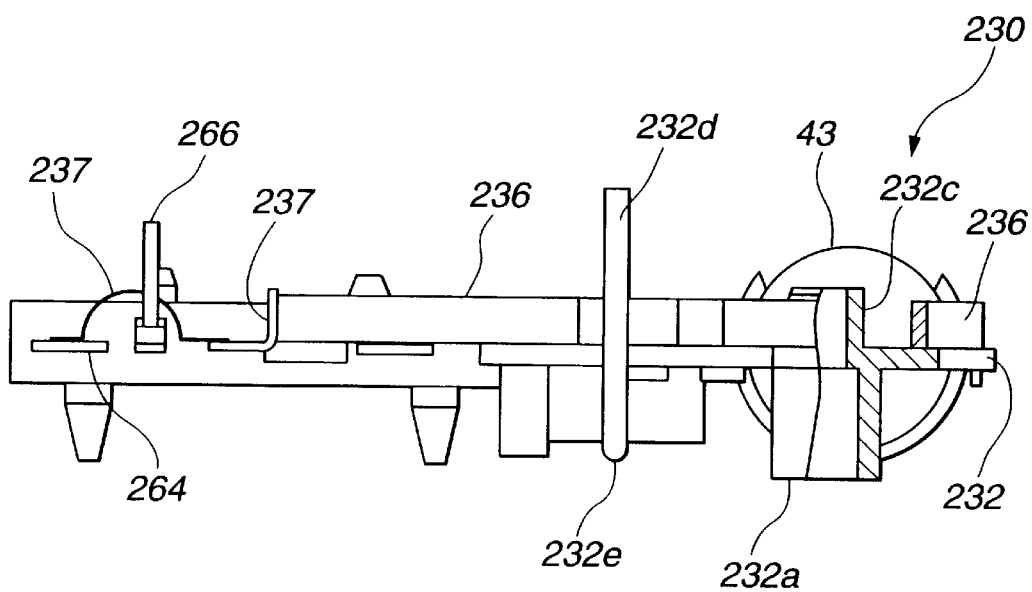
FIG. 13 is a partially cut side view of the second drive circuit, taken from a right side of FIG. 12.

FIG. 12 is a plan view showing the second drive circuit 230, and FIG. 13 is a right side view of the second drive circuit 230 with a part removed. As is seen from these drawings, the plastic holding case 232 of the second drive circuit 230 is equipped with the larger chemical condenser, a smaller chemical condenser 243, a common mode choke coil 45 and a varistor 235. To the plastic holding case 232, there are further mounted a plus terminal 264, an earth terminal 265, a signal input terminal 266. An electric power from a battery installed in a corresponding vehicle is led to the second drive circuit 230 through the two terminals 264 and 265, and a control signal is led into the second drive circuit 230 through the signal input terminal 266. A plurality of bus bars 236 are further employed for connecting the parts of the second drive circuit 230. Some of the bus bars 236 have leading ends 236a connected to the terminals 261. As is seen from FIGS. 12 and 13, a spring fuse 237 is put between the plus terminal 264 and one of the bus bars 236. The inner surface of the plastic holding case 232 is formed with tubular upward projections 232b with which the above-mentioned projections 21a of the upper case part 21 are engaged upon installation of the holding case 232 to the upper case part 21. The interior of each tubular projection 232b is merged with a bolt opening 232a. The holding case 232 is formed on its surface with bolt mounting seats 232c each surrounding the bolt opening 232a (see FIG. 13). At a central portion of the holding case 232, there extends a partition wall 232d by which first and second chambers 210a and 210b (see FIG. 9) are partitioned. Within the first chamber 210a, there is installed the control circuit 210a and within the second chamber 210b, there are installed the first and second drive circuits 220 and 230 and the heat sink 24.

As is seen from FIG. 13, the partition wall 232d is formed with an engaged edge 232e which is in engagement with the above-mentioned grooves 50d and 21c. The engaged edge 232e has a generally U-shaped cross section.

Figure 14:
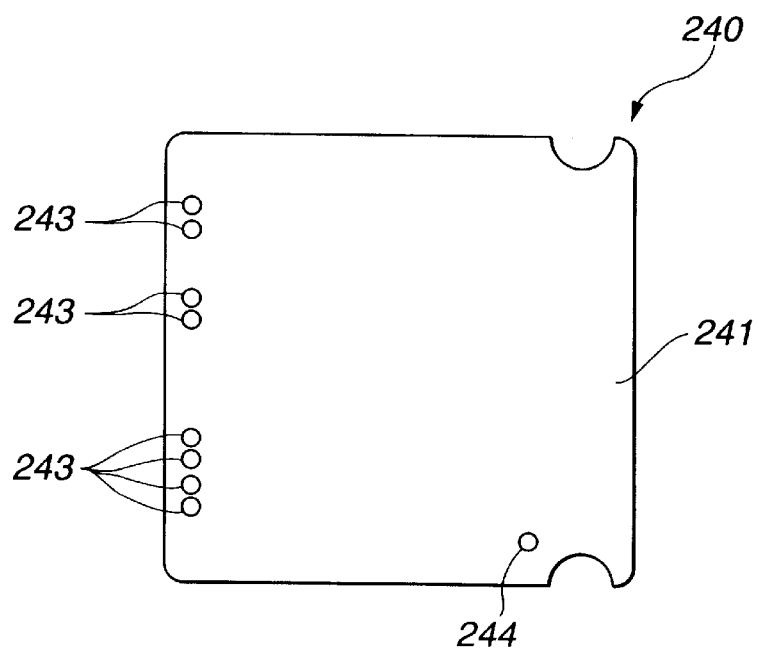
FIG. 14 is a plan view of a substitute of a control circuit employed in the second embodiment.

FIG. 14 is a plan view of a circuit substrate 241 of the control circuit 240. As shown, the substitute 241 is formed with eight openings 243 through which the above-mentioned eight terminals 262 pass and one opening 244 through which the above-mentioned signal input terminal 266 passes.

Figure 15:
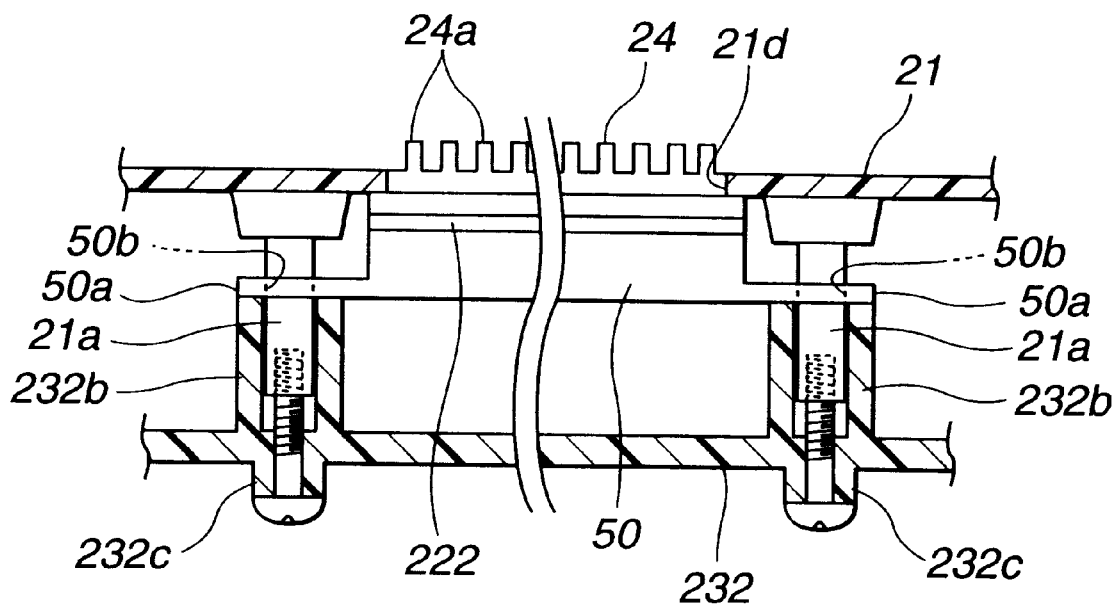
FIG. 15 is an illustration for explaining the manner for mounting a supporting case and a holding case 232 to an upper case part of an electric parts protecting case.
Figure 16:
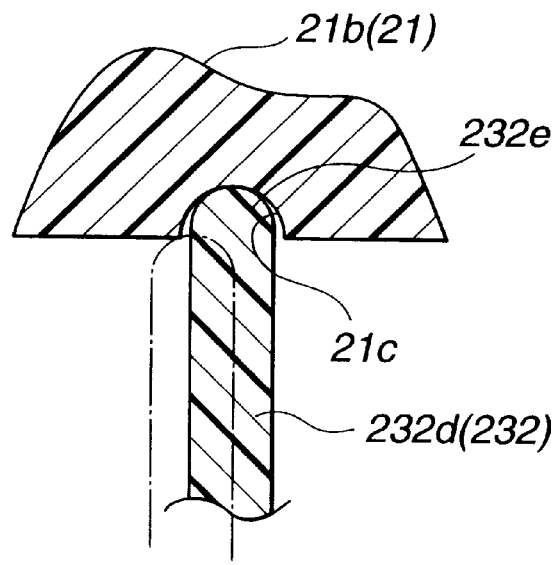
FIG. 16 is a sectional view for explaining a positioning between the upper case part and holding case.
Figure 17:
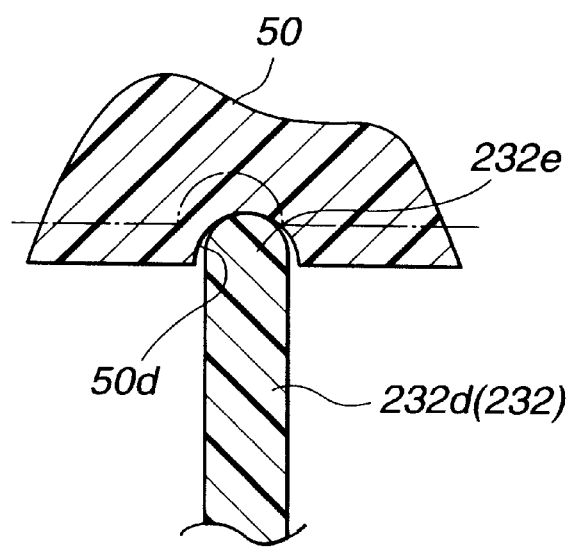
FIG. 17 is a sectional view for explaining a positioning between the supporting case and the holding case.

FIG. 15 is a sectional view showing a manner in which the supporting case 50 and the holding case 232 are secured to the upper case part 21, FIG. 16 is a sectional view for explaining positioning of the holding case 232 and FIG. 17 is a sectional view for explaining positioning of the supporting case 50.

As is seen from FIG. 15, in order to connect the connecting the supporting case 50 and the holding case 232 to the upper case part 21, the heat sink 24 is at first put in a mounting aperture 21d formed in the upper case part 21. Then, the projections 21a of the upper case part 21 are passed through the openings 50b of the ear portions 50a of the supporting case 50 causing a back surface of the aluminum substrate 222 to abut against a lower surface of the heat sink 24, and the projections 21a are inserted into the tubular projections 232b of the holding case 232 and finally, connecting bolts (no numerals) passing through the bolt mounting seats 232c are engaged with threaded bores of the projections 21a. With this, the holding case 232 and the supporting case 50 are secured to the upper case part 21. The heat sink 24 is bonded to the upper case part 21 and the aluminum substrate 222 is bonded to the heat sink 24.

In the following, advantages of the brushless motor 100B of the second embodiment will be described.

As is seen from FIGS. 16 and 17, when the holding case 232 is about to be mounted to its proper position, the engaged edge 232e of the partition wall 232d of the holding case 232 becomes engaged with the grooves 21c of the upper case part 21 and the groove 50d of the supporting case 50. This establishes a positioning between the holding case 232, upper case part 21 and the supporting case 50. More specifically, even if a certain misregistration of the parts takes place in parts protecting case 20, such misregistration becomes automatically removed once the holding case 232 is connected to its proper position. With such positioning arrangement, assembly of the brushless motor 100B is readily carried out.

As is seen from FIG. 9, within the parts protecting case 20, there are provided first and second chambers 210a and 210b partitioned by the partition wall 232d of the holding case 232. In the first chamber 210a, there is installed the control circuit 240, and in the second chamber 210b, there are installed the first and second drive circuits 220 and 230 and the heat sink 24. The provision of the partition wall 232d promotes heat transmission from the first and second drive circuits 220 and 230 to the heat sink 24, and suppresses or at least minimizes heat transmission from the second chamber 210b to the first chamber 210a in which the control circuit 240 is arranged.

Because the brushless motor 100B of this second embodiment has various structures that are similar to those of the motor 100A of the first embodiment, almost all advantages possessed by the motor 100A are also expected in this second embodiment 100B.

Figure 18:
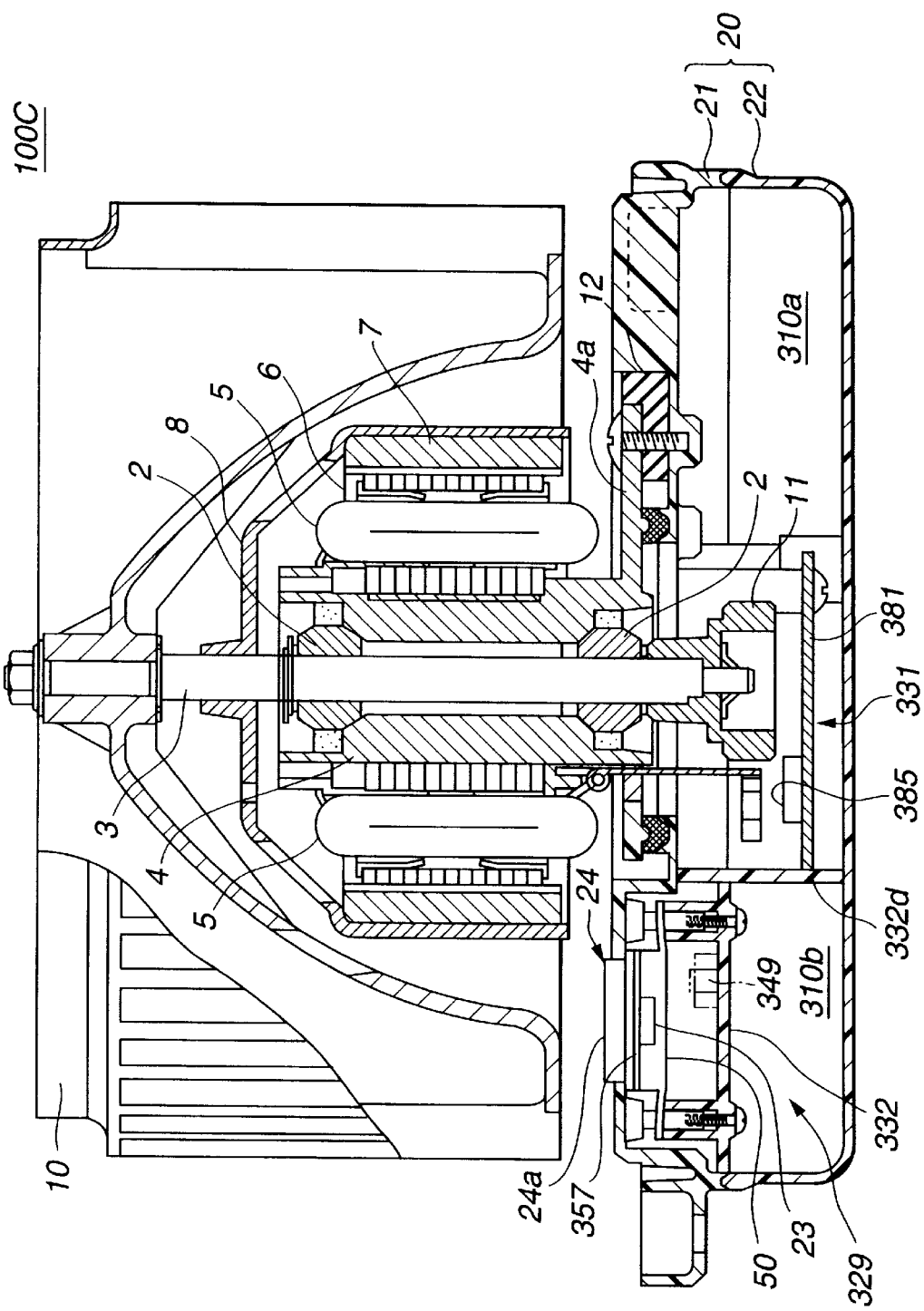
FIG. 18 is a sectional view of a brushless motor of a third embodiment of the present invention.
Figure 19:
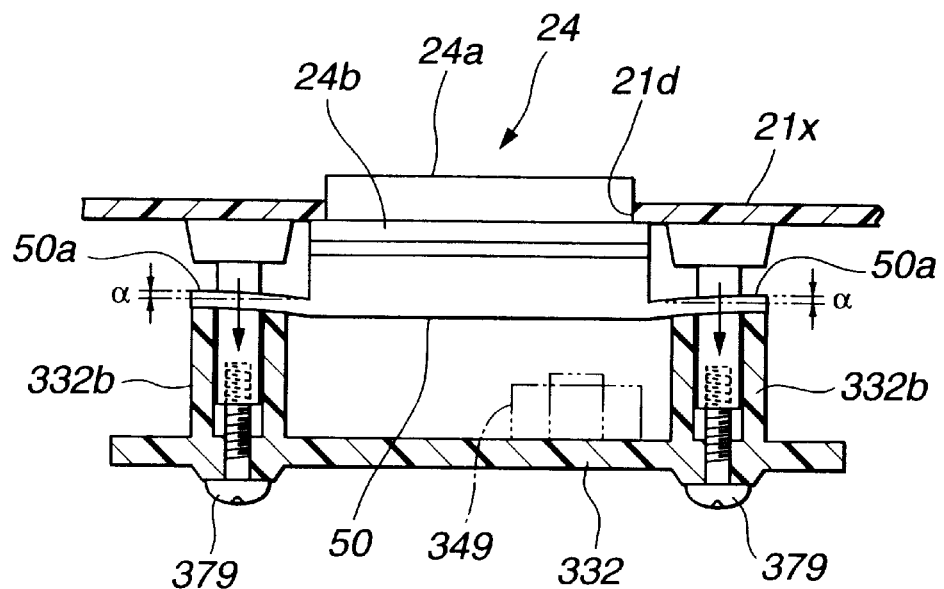
FIG. 19 is a sectional view of an essential portion of the third embodiment in an assembled condition.
Figure 20:
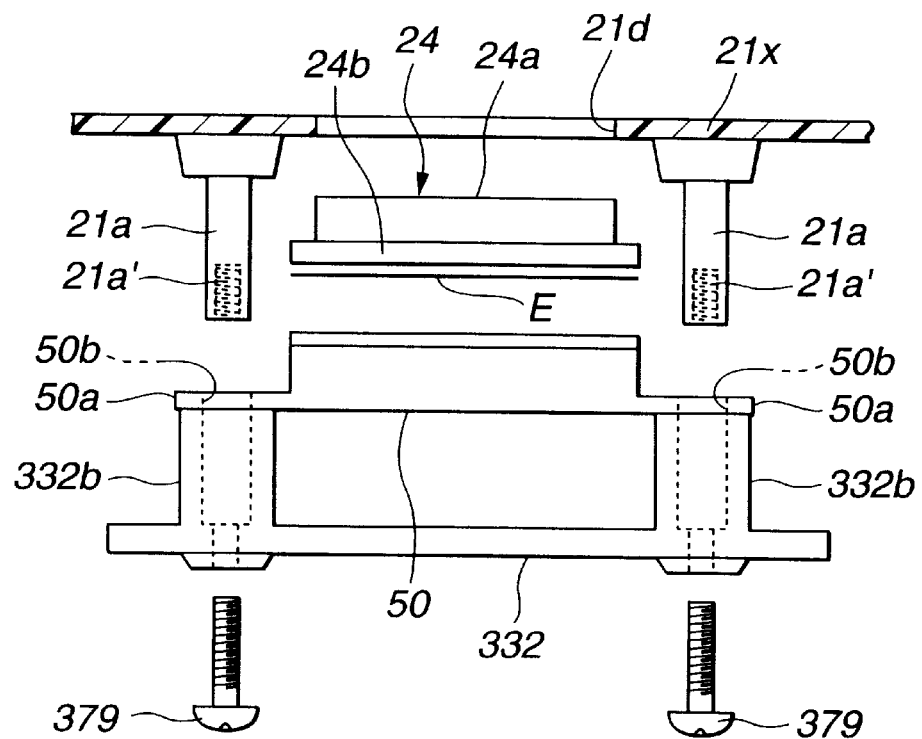
FIG. 20 is an exploded view of the essential portion of the third embodiment.
Figure 21:
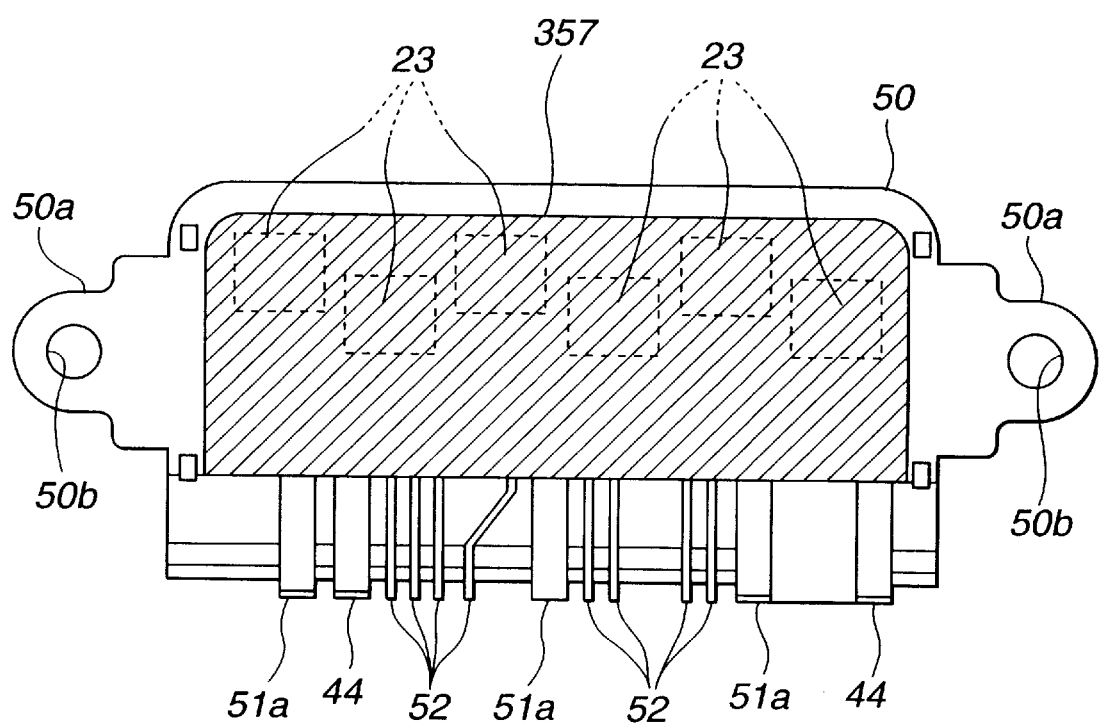
FIG. 21 is a view taken from a back side of a supporting case.
Figure 22:
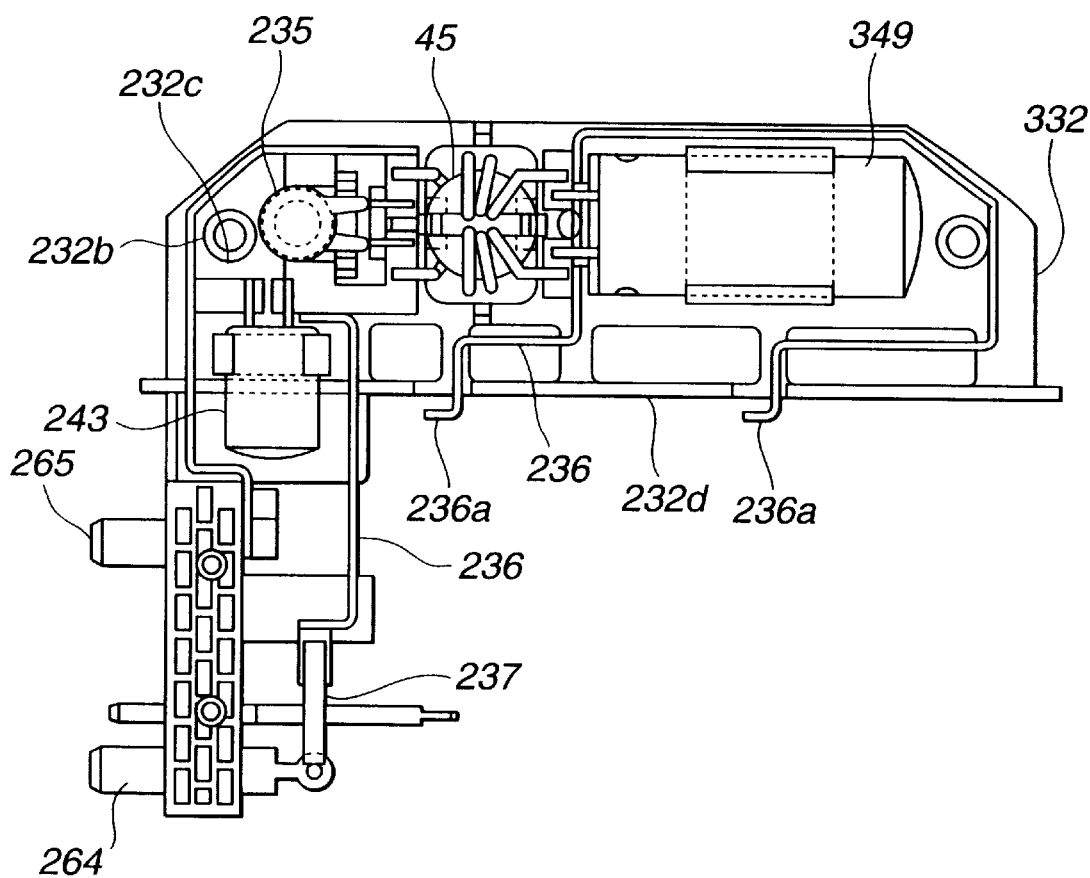
FIG. 22 is a view taken from a back side of a holding case.
Figure 23:
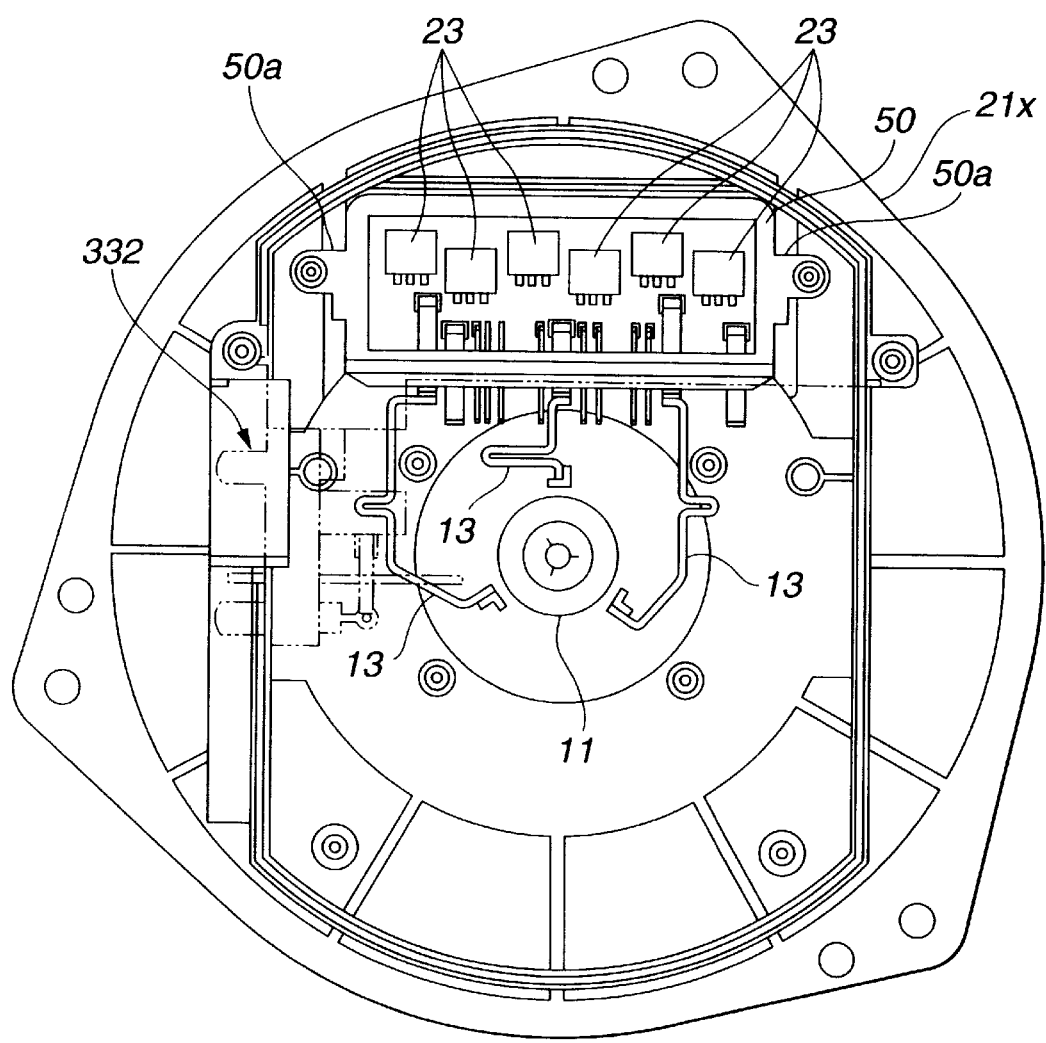
FIG. 23 is a bottom view of the brushless motor of the third embodiment.

Referring to FIGS. 18 to 23, particularly FIG. 18, there is shown a brushless motor 100C which is a third embodiment of the present invention.

Since the brushless motor 100C of this third embodiment is similar in construction to the above-mentioned brushless motor 100A of the first embodiment, detailed explanation will be directed to only parts and portions which are different from those of the first embodiment 100A. Substantially the same parts as those of the first embodiment 100A are denoted by the same numerals for ease of understanding.

As will be easily understood when comparing FIGS. 1 and 18, the lower part of the brushless motor 100C is different from that of the first embodiment 100A.

In the third embodiment 100C, within an electric parts protecting case 20, there are installed first and second drive circuits 329 and 331. Like the above-mentioned second embodiment 100B, there is also arranged in the electric parts protecting case 20 a partition wall 332d by which the interior of the case 20 is partitioned into first and second chambers 310a and 310b. Within the first chamber 310a, the second drive circuit 331 is installed, and within the second chamber 310b, the first drive circuit 329 is installed.

The first drive circuit 329 is arranged on a plastic holding case 332 and includes a condenser 349 and a plurality of switching elements 23 mounted on a plastic supporting case 50. As is seen from FIG. 21, the switching elements 23 are mounted on an aluminum substrate 357 mounted on the plastic supporting case 50. The supporting case 50 is formed with ear portions 50a each having an opening 50b. As is seen from FIG. 18, the aluminum substrate 357 is fixed to an upper surface of the supporting case 50, having its back surfact facing upward.

For securing both the plastic supporting case 50 and the plastic holding case 332 to the upper case part 21 of the electric parts protecting case 20, a mounting plate 21x to be secured to the upper case part 21 is used. As is best seen from FIG. 20, the mounting plate 21x is formed with downward projections 21a and a mounting aperture 21d. The leading portion of each projection 21a is formed with a threaded bore 21a. The inner surface of the plastic holding case 332 is formed with tubular upward projections 332b each having a through bore (no numeral).

For assembly, a flange portion 24b of the heat sink 24 is bonded to the aluminum substrate 357 of the supporting case 50 by means of an adhesive E. Then, the supporting case 50 is loosely coupled with the mounting plate 21x by having the projections 21a inserted through the openings 50b of the ear portions 50a of the supporting case 50. With this, the heat radiation fins 24a of the heat sink 24 are projected outside through the aperture 21d of the mounting plate 21x. Then, the plastic holding case 332 is loosely coupled with the mounting plate 21x by having the projections 21a inserted through the through bores of the upward projections 332b of the holding case 332. Then, as is best seen from FIG. 19, bolts 379 are inserted into the through bores and turned to engage with the threaded bores 21a' of the downward projections 21a of the mounting plate 21x. Finally, the mounting plate 21x is bolted to the upper case part 21. As is seen from FIG. 19, if the bolts 379 are tightly fastened, the ear portions 50a of the supporting cases 50 are resiliently bent by a degree "α", so that the unit including the supporting cases 50 and the heat sink 24 is tightly attached to the mounting plate 21x with a certain biasing force.

The second drive circuit 331 is arranged on an aluminum substrate 38a that is held by the upper case part 21. On the substrate 38a, there are arranged a Hall-element (not shown) incorporated with the sensor magnet 11, a microcomputer 385 for controlling the switching elements 23 and so on. It is to be noted that the second drive circuit 331 and the above-mentioned first drive circuit 329 are connected through a plurality of bus bars.

Figure 24:
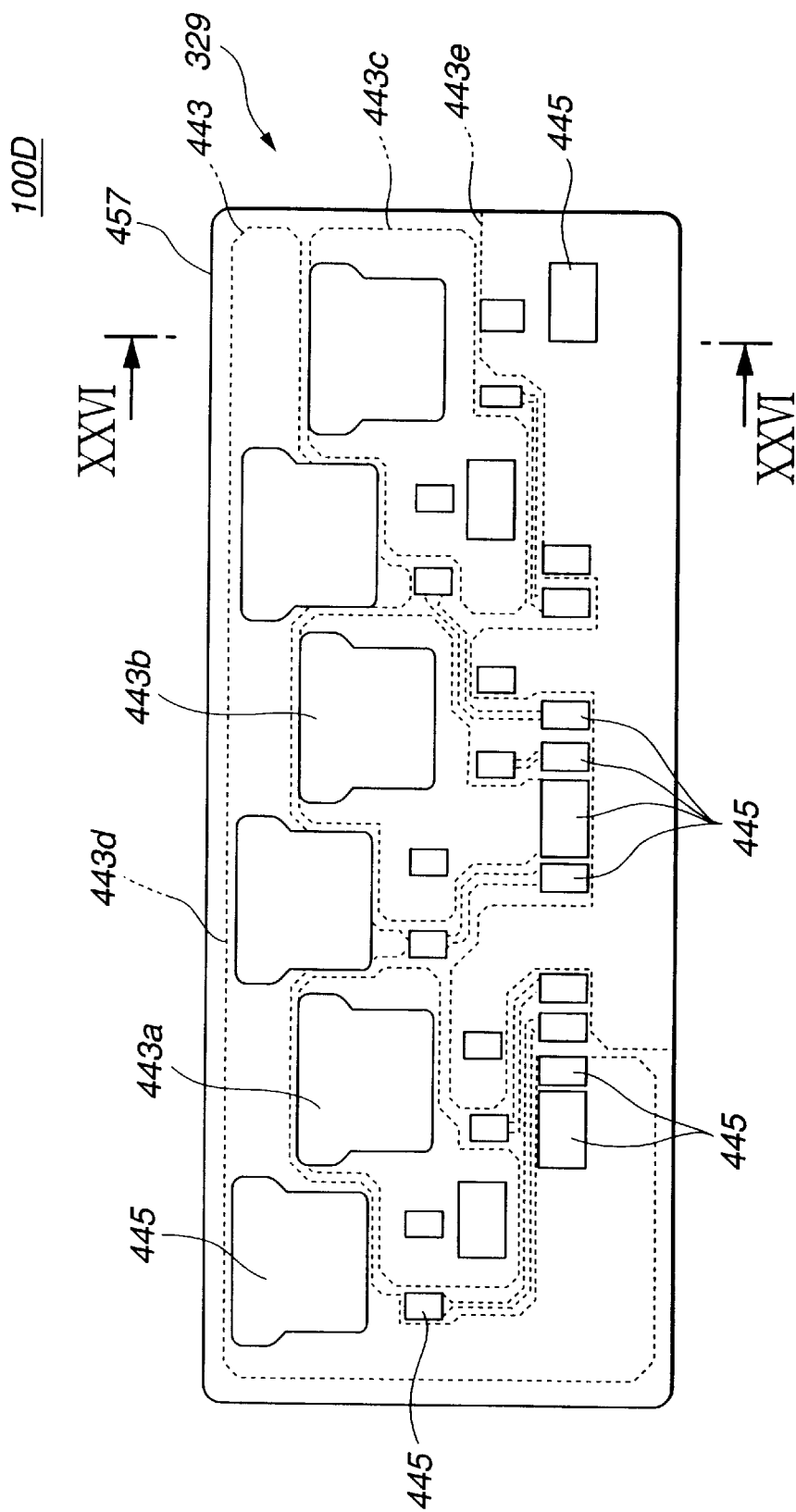
FIG. 24 is a plan view of an aluminum substitute employed in a brushless motor of a fourth embodiment.
Figure 25:
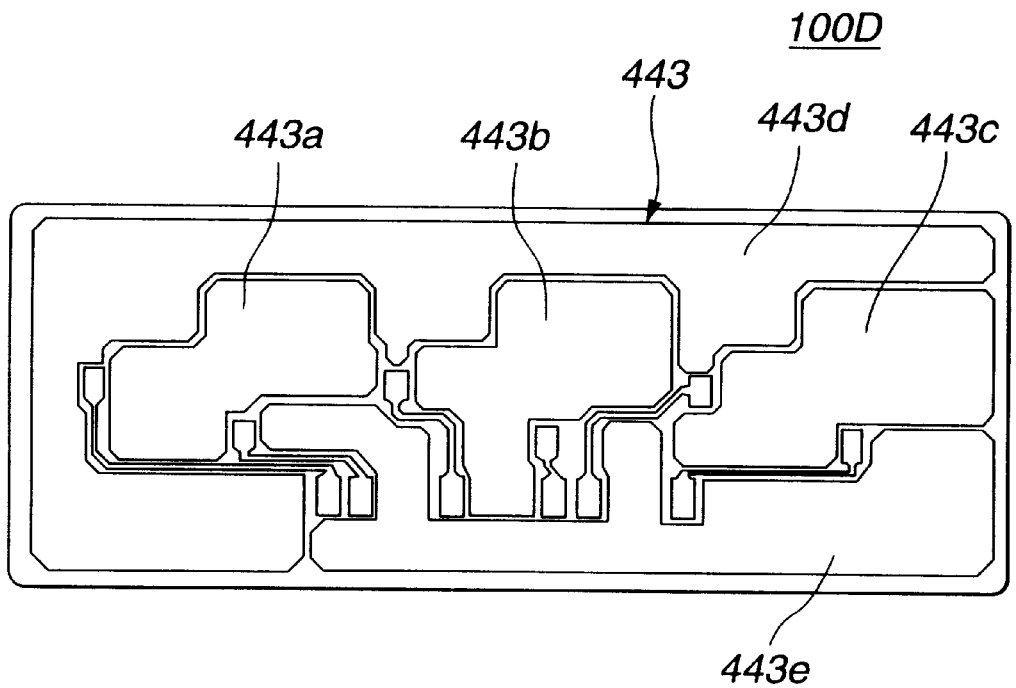
FIG. 25 is a plan view of the aluminum substitute of FIG. 24, showing a wiring pattern.
Figure 26:
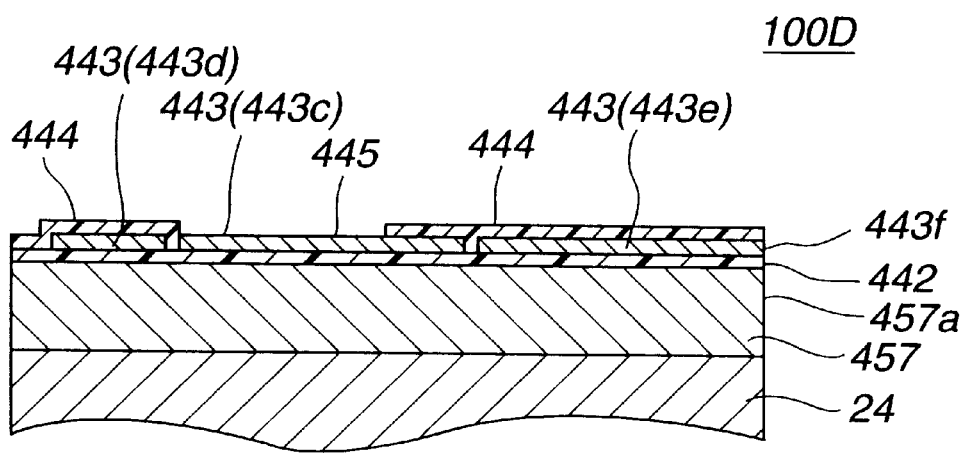
FIG. 26 is an enlarged sectional view taken along the line XXVI—XXVI of FIG. 24.

Referring to FIGS. 24 to 26, there is shown part of a brushless motor 100D which is a fourth embodiment of the present invention.

Since this embodiment 100D is substantially the same as the above-mentioned third embodiment 100C except a small part, the detailed following description will be directed to only the different small part.

That is, in this fourth embodiment 100D, an improvement is applied to an aluminum substrate 457 on which the first drive circuit 329 is arranged.

As is understood from FIGS. 24 and 26, especially FIG. 26, on an upper surface of the aluminum substrate 457, there is coated an insulating film 442. On this insulating film 442, there are arranged given wiring patterns 443, and on the given wiring patterns 443, there is coated a protection film 444. The protecting film 444 is formed with a plurality of apertures through which given portions (viz., lands 445) of the wiring patterns 443 are exposed. To the lands 445, there are connected the connecting terminals of the switching elements 23 and various bus bars through welding.

As is understood from FIGS. 24 and 25, the wiring pattern 443 comprises a U-phase part 443a connected to U-phase coils 5 of the stator 6, a V-phase part 443b connected to V-phase coils 5 of the stator 6 and a W-phase part 443c connected to W-phase coils 5 of the stator 6. Furthermore, the wiring pattern 443 has an anode part 443d that is connected through bus bars to plus terminals of a source connector of the first drive circuit 329, and a ground part 443e that is connected through bus bars 44 to ground terminals of the source connector.

As is seen from FIG. 26, the ground part 443e extends to an edge 457a of the aluminum substrate 457. That is, an edge 443f of the ground part 443e and the edge 457a of the aluminum substrate 457 are insulated from each other by the insulating film 442. This arrangement is advantageous because static electricity which would be charged in the heat sink 24 and the aluminum substrate 457 can be easily released to the ground part 443e through atmospheric discharge. Thus, the switching elements 23 mounted on the aluminum substrate 457 can be protected from such static electricity. Since the heat sink 24 is insulated from the ground part 43e of the wiring part 443, the heat sink 24 is prevented from becoming an antenna that tends to emit noises.

Figure 27:
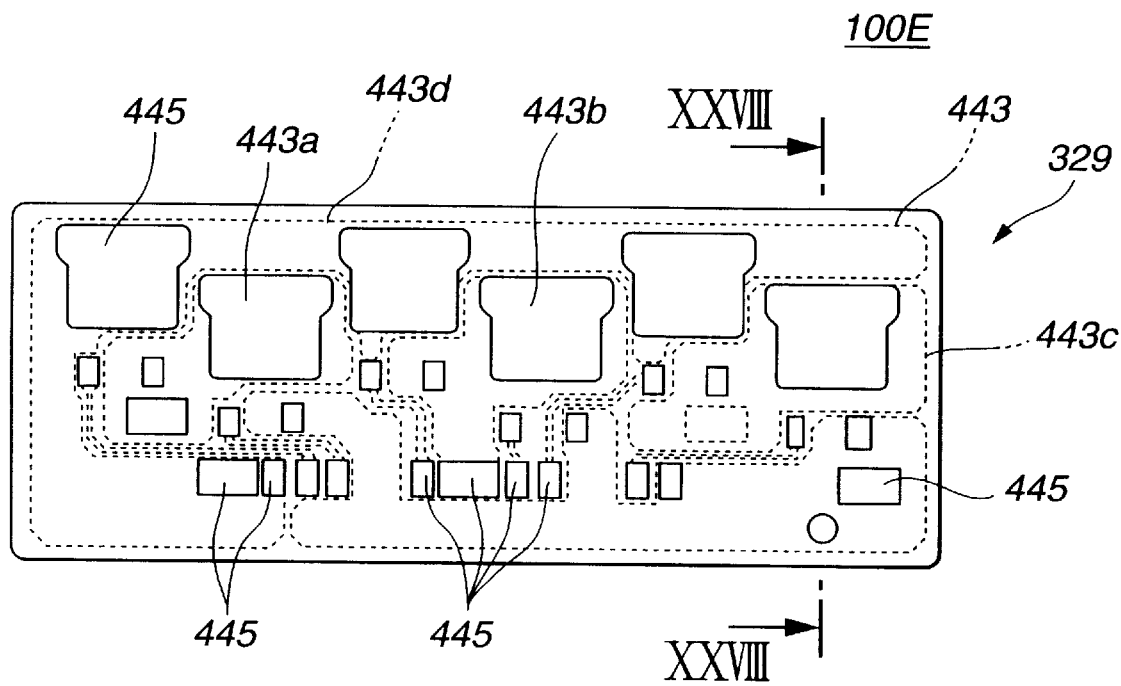
FIG. 27 is a view similar to FIG. 24, but showing an aluminum substitute employed in a brushless motor of a fifth embodiment of the invention.
Figure 28:
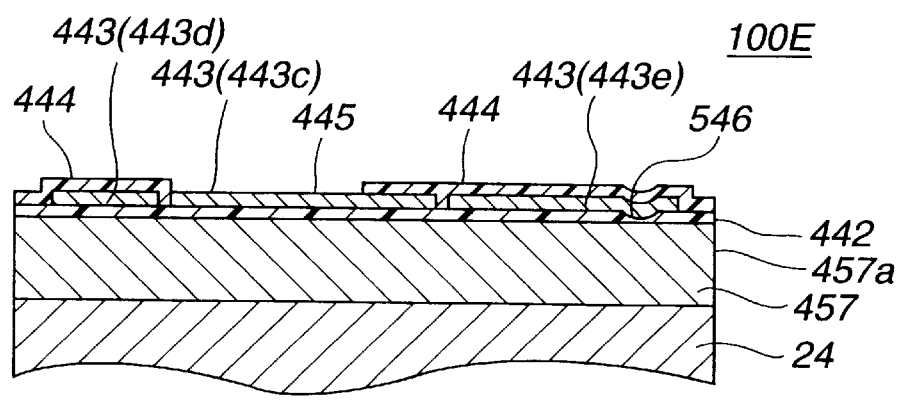
FIG. 28 is an enlarged sectional view taken along the line XXVIII—XXVIII of FIG. 27.

Referring to FIGS. 27 and 28, there is shown a part of a brushless motor 100E which is a fifth embodiment of the present invention.

Since this embodiment 100E is substantially the same as the above-mentioned fourth embodiment 100D except a part, the detailed description will be directed to only such part.

As is seen from FIG. 28, in this fifth embodiment 100E, the ground part 443e of the wiring pattern 443 does not reach the edge 457a of the aluminum substrate 457. But near the edge 457a, the insulating film 442 has a thinner part 546 that easily brings about dielectric breakdown between the ground part 443e and the aluminum substrate 457. The thinner part 546 is produced by hitting a corresponding portion with a center-punch or the like. Due to the nature of such thinner part 546, when a static electricity charged in the heat sink 24 increases to a certain level, the dielectric breakdown takes place. Thus, like in the above-mentioned fourth embodiment 100D, the switching elements 23 which are very sensitive elements can be protected from such static electricity. For the same reason, the heat sink 24 is prevented from becoming an antenna.

Figure 29:
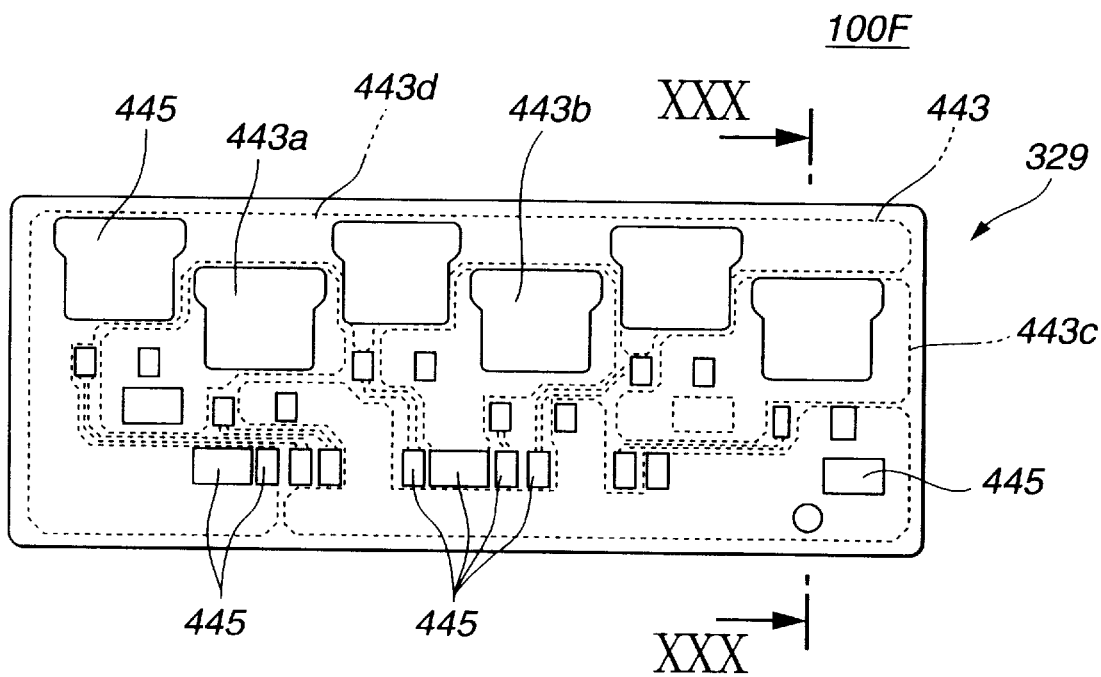
FIG. 29 is a view similar to FIG. 24, but showing an aluminum substitute employed in a brushless motor of a sixth embodiment of the invention.
Figure 30:
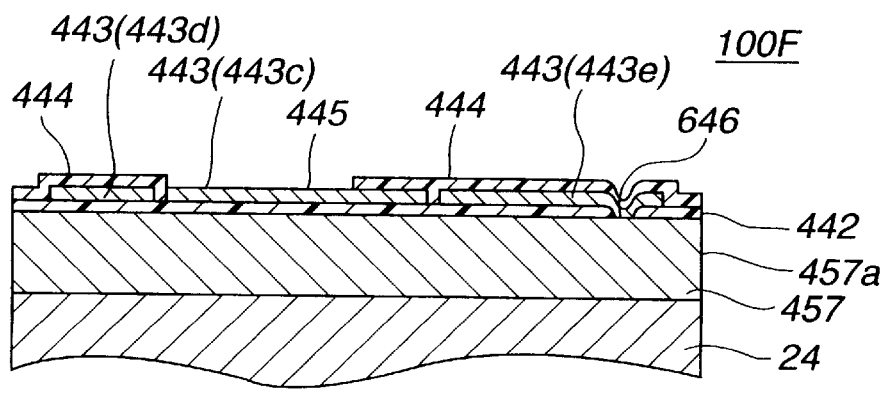
FIG. 30 is an enlarged sectional view taken along the line XXX—XXX of FIG. 29.

Referring to FIGS. 29 and 30, there is shown a part of a brushless motor 100F which is a sixth embodiment of the present invention.

Since this embodiment 100F is substantially the same as the above-mentioned fourth embodiment 100D except some parts, the detailed description will be directed to only such parts.

As is seen from FIG. 30, in the sixth embodiment 100F, the ground part 443 of the wiring pattern 443 does not reach the edge 457a of the aluminum substrate 457, like in the case of the fifth embodiment 100E. Furthermore, in the sixth embodiment 100F, near the edge 457a, the ground part 443e has a connecting part 646 connected with the aluminum substrate 457. This connection is achieved by hardly hitting a corresponding portion with a center-punch or the like. Due to the connection, a static electricity charged in the heat sink 24 easily flows into the ground part 443e thereby protecting the switching elements 23 from such static electricity.

Although the invention has been described above with reference to certain embodiments of the invention, the invention is not limited to the embodiments described above. Various modifications and variations of the embodiments described above will occur to those skilled in the art, in light of the above teachings.

What is claimed is:

1. A brushless motor comprising:

a housing;

a drive shaft rotatably held by said housing;

a stator disposed on said housing and having a plurality of coils which are arranged to surround said drive shaft;

a yoke secured to said drive shaft to rotate therewith;

a plurality of magnets that are held by said yoke in a manner to surround said stator keeping a given space therebetween;

a drive circuit installed in said case for energizing said coils of said stator, said drive circuit including a plurality of switching elements each changing the direction of electric current flowing in the corresponding coil of the stator, said drive circuit being arranged on a drive circuit substrate;

a control circuit installed in said case for controlling operation of said switching elements to adjust a rotation speed of said drive shaft, said control circuit being arranged on a control circuit substrate;

an electric parts protecting case on which said housing is mounted, said electric parts protecting case being formed with a partition wall member by which the interior of said case is divided into first and second chambers which respectively receive said drive and control circuits respectively;

electric connectors for connecting said drive and control circuits; and a heat sink held by said case, said heat sink including a hidden portion exposed to an interior of said case and a plurality of heat radiation fins exposed to the outside of said case, said hidden portion having said switching elements attached thereto, wherein said drive circuit substrate includes a first substrate that carries a first predetermined wiring pattern connected to said switching elements to constitute a first drive circuit part and a second substrate that carries a second predetermined wiring pattern connected to electric parts other than said switching elements, to constitute a second drive circuit part, said first and second drive circuit parts being connected through electric connecting means, said first drive circuit part being connected to said control circuit through said electric connectors.

2. A brushless motor as claimed in claim 1, in which said first substrate is constructed of a high thermal conductive material and has one surface which has said switching elements mounted thereto and the other surface which is intimately connected to said hidden portion of said heat sink.

3. A brushless motor as claimed in claim 2, in which said electric parts protecting case includes an upper case part on which said housing is mounted and to which said heat sink is mounted and a lower case part on which said upper case part is mounted, and in which said heat sink and said first substrate are coupled by means of a supporting case.

4. A brushless motor as claimed in claim 3, in which said supporting case has ear portions each being put between said upper case part and said second substrate, and in which said second substrate, each of said ear portions and said upper case part are connected together through connecting means.

5. A brushless motor as claimed in claim 4, in which said upper case part is of a molded plastic and said heat sink is integrally connected with the plastic upper case part.

6. A brushless motor as claimed in claim 5, further comprising terminal pins passing through said upper case part, each terminal pin having one end connected to one of the coils of said stator and the other end connected to said first drive circuit part through a corresponding bus bar, said bus bar having a resiliently deformable portion.

7. A brushless motor as claimed in claim 6, in which said control circuit substrate, said first substrate and said second substrate are positioned away from said terminal pins and in which said bus bar is arranged in said case at a position away from said control circuit substrate and said second substrate.

8. A brushless motor as claimed in claim 1, in which said heat sink is positioned above said second drive circuit part when said electric parts protecting case is normally put on a horizontal ground.

9. A brushless motor as claimed in claim 1, in which said second drive circuit part is equipped with a power source connector through which an electric power is led to said second drive circuit part, and in which said second substrate is equipped with a plastic base body by which electric parts of said second drive circuit part are held and bus bars by which said electric parts held by said plastic base body and said power source connector are connected.

10. A brushless motor as claimed in claim 9, in which said plastic base body and said power source connector are integrally formed.

11. A brushless motor as claimed in claim 10, in which said second drive circuit part is equipped with a fuse, said fuse becoming melted down when heated to a certain degree, thereby shutting the electric supply to said second drive circuit part.

12. A brushless motor as claimed in claim 1, further comprising:
   a supporting case by which said drive circuit substrate and said heat sink are coupled;
   a plastic holding case for holding electric parts of said drive circuit;
   first engaging means defined by said electric parts protecting case;
   second engaging means defined by said supporting case; and
   third engaging means defined by said plastic holding case, said third engaging means being engaged with both said first and second engaging means to establish a positioning between said case, said supporting case and said plastic holding case.

13. A brushless motor as claimed in claim 12, in which said first and second engaging means constitute a groove and in which said third engaging means constitutes a ridge whose top is sized to mate with said groove.

14. A brushless motor as claimed in claim 1, further comprising:
   a supporting case by which said drive circuit substrate and said heat sink are coupled;
   a plastic holding case for holding electric parts of said drive circuit;
   an aperture provided in an upper portion of said electric parts protecting case, said aperture being sized to receive therein said heat radiation fins of said heat sink when said heat sink is attached to a lower surface of said upper portion;
   projections extending from said upper portion of said electric parts protecting case, each projection having a threaded bore in its leading end;
   openings formed in said supporting case;
   through bores formed in said plastic holding case; and
   bolts, each bolt passing through one of said through bores and one of said openings and engaged with the threaded bore of one of said projections to secure both said supporting case and said plastic holding case to the upper portion of said electric parts protecting case.

15. A brushless motor as claimed in claim 14, in which said supporting case is formed with resiliently bending ear portions which produce a biasing force for biasing said supporting case against said heat sink when said bolts are tightly fastened to said projections.

16. A brushless motor as claimed in claim 15, in which each of said ear portion is thinner than a body of said supporting case.

17. A brushless motor as claimed in claim 1, in which said drive circuit substrate is an aluminum substrate that is coated with an insulating film and attached to the hidden portion of said heat sink, said drive circuit including a given wiring pattern that is arranged on said insulating film.

18. A brushless motor as claimed in claim 17, in which said wiring pattern has a terminal end that is insulated from a terminal end of said aluminum substrate by a terminal end of said insulating film.

19. A brushless motor as claimed in claim 17, in which said insulating film has a thinner portion whose thickness is determined so that dielectric breakdown between said wiring pattern and said aluminum substrate is easily caused.

20. A brushless motor as claimed in claim 19, in which the thinner portion of said insulating film is produced by hitting a corresponding position with a pointed hard tool.

21. A brushless motor as claimed in claim 17, in which said insulating film has an opening through which a part of said wiring pattern and a part of said aluminum substrate are electrically connected.

22. A brushless motor as claimed in claim 21, in which said opening of said insulating film is produced by hitting a corresponding portion with a pointed hard tool.

23. An electric blower for use in an automotive air conditioner, comprising:
   a brushless motor comprising a housing, a drive shaft rotatably held by said housing, a stator disposed on said housing and having a plurality of coils which are arranged to surround said drive shaft, a yoke secured to said drive shaft to rotate therewith, a plurality of magnets that are held by said yoke in a manner to surround said stator keeping a given space therebetween, an electric parts protecting case on which said housing is mounted, a drive circuit installed in said case for energizing said coils of said stator and including a plurality of switching elements each changing the direction of electric current flowing in the corresponding coil of the stator, said drive circuit being arranged on a drive circuit substrate, a control circuit installed in said case for controlling operation of said switching elements to adjust a rotation speed of said drive shaft and arranged on a control circuit substrate, electric connectors for connecting said drive and control circuits, and a heat sink held by said case, said heat sink including a hidden portion exposed to an interior of said case and a plurality of heat radiation fins exposed to the outside of said case, said hidden portion having said switching elements attached thereto; and a fan concentrically connected to said drive shaft of said brushless motor to rotate therewith, wherein the heat radiation fins of said heat sink of said brushless motor are positioned in an area where a high speed air flow appears when said brushless motor is energized, wherein said drive circuit substrate includes a first substrate that carries a first predetermined wiring pattern connected to said switching elements to constitute a first drive circuit part and a second substrate that carries a second predetermined wiring pattern connected to electric parts other than said switching elements, to constitute a second drive circuit part, said first and second drive circuit parts being connected through electric connecting means, said first drive circuit part being connected to said control circuit through said electric connectors.

24. An electric blower as claimed in claim 23, in which said fan is of a centrifugal multi-blade type and in which said heat radiation fins of said heat sink are positioned blow said fan within an area that faces an entirety of a bottom of said fan.

\* \* \* \* \*